US012761609B2

(12) United States Patent
Warrens et al.

(10) Patent No.: US 12,761,609 B2
(45) Date of Patent: Oct. 13, 2026

(54) AUTONOMOUS SITUATION AWARENESS WITH AMBIENT AND REFLEXIVE CONTEXT AND ANOMALY-DRIVEN PREDICATES

(71) Applicant: ORACLE INTERNATIONAL CORPORATION, Redwood Shores, CA (US)

(72) Inventors: Gerard Warrens, Gilbert, AZ (US); Esraa Maher Mounir Samy Moustafa, Ft. Myers, FL (US); Kenny C. Gross, Escondido, CA (US); Richard P. Sonderegger, Dorchester, MA (US); Kenneth P. Baclawski, Waltham, MA (US); Dieter Gawlick, Palo Alto, CA (US); Anna Morav, East Palo Alto, CA (US); Guang Chao Wang, San Diego, CA (US); Matthew T. Gerdes, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 279 days.

(21) Appl. No.: 18/604,889

(22) Filed: Mar. 14, 2024

(65) Prior Publication Data

US 2025/0291321 A1 Sep. 18, 2025

(51) Int. Cl.
*G05B 13/02* (2006.01)
*G06N 5/022* (2023.01)

(52) U.S. Cl.
CPC ......... *G05B 13/0265* (2013.01); *G06N 5/022* (2013.01)

(58) Field of Classification Search
CPC ............................ G05B 13/0265; G06N 5/022
(Continued)

(56) References Cited

U.S. PATENT DOCUMENTS 4,686,655 A 8/1987 Hyatt
7,020,802 B2 3/2006 Gross et al.
(Continued)

FOREIGN PATENT DOCUMENTS

CN 107181543 A1 9/2017
CN 110941020 A1 3/2020
DE 4447288 A1 7/1995

OTHER PUBLICATIONS

Patent Cooperation Treaty (PCT), International Search Report and Written Opinion issued in PCT International Application No. PCT/US2021/015802 having a date of mailing of May 28, 2021 (13 pgs).
(Continued)

*Primary Examiner* — Md Azad
(74) *Attorney, Agent, or Firm* — Kraguljac Law Group LLC

(57) ABSTRACT

Systems, methods, and other embodiments associated with autonomous situation awareness based on ambient intelligence and permuted binary-state predicate classification are described. In one embodiment, a method includes accessing a stream of multivariate observations of system status and command variables. The method supplements the multivariate observations with ML estimates of ambient variables based on the system variables and command variables. The method determines anomalies of the system variables based on residuals between observed values and ML estimates of the system variables based on the supplemented observations. The method evaluates the anomalies with predicates to select one of the command variables to be adjusted. The method generates a suggestion for the selected command variable based on ML predictions of future values for the system variables. And, the method generates an electronic alert to adjust the controls of the asset to match the suggestion for the selected command variable.

19 Claims, 6 Drawing Sheets

(58) Field of Classification Search
USPC .......................................................... 700/47
See application file for complete search history.

(56) References Cited

U.S. PATENT DOCUMENTS

| | | | |
|---|---|---|---|
| 7,171,586 | B1 | 1/2007 | Gross et al. |
| 7,191,096 | B1 | 3/2007 | Gross et al. |
| 7,281,112 | B1 | 10/2007 | Gross et al. |
| 7,292,659 | B1 | 11/2007 | Gross et al. |
| 7,391,835 | B1 | 6/2008 | Gross et al. |
| 7,542,995 | B2 | 6/2009 | Thampy et al. |
| 7,573,952 | B1 | 8/2009 | Thampy et al. |
| 7,613,576 | B2 | 11/2009 | Gross et al. |
| 7,613,580 | B2 | 11/2009 | Gross et al. |
| 7,702,485 | B2 | 4/2010 | Gross et al. |
| 7,869,977 | B2 | 1/2011 | Lewis et al. |
| 8,055,594 | B2 | 11/2011 | Dhanekula et al. |
| 8,069,490 | B2 | 11/2011 | Gross et al. |
| 8,150,655 | B2 | 4/2012 | Dhanekula et al. |
| 8,200,991 | B2 | 6/2012 | Vaidyanathan et al. |
| 8,214,682 | B2 | 7/2012 | Viadyanathan et al. |
| 8,275,738 | B2 | 9/2012 | Gross et al. |
| 8,341,759 | B2 | 12/2012 | Gross et al. |
| 8,365,003 | B2 | 1/2013 | Gross et al. |
| 8,452,586 | B2 | 5/2013 | Master et al. |
| 8,457,913 | B2 | 6/2013 | Zwinger et al. |
| 8,543,346 | B2 | 9/2013 | Gross et al. |
| 9,514,213 | B2 | 12/2016 | Wood et al. |
| 9,911,336 | B2 | 3/2018 | Schlechter et al. |
| 9,933,338 | B2 | 4/2018 | Noda et al. |
| 10,015,139 | B2 | 7/2018 | Gross et al. |
| 10,452,510 | B2 | 10/2019 | Gross et al. |
| 10,496,084 | B2 | 12/2019 | Li et al. |
| 10,860,011 | B2 | 12/2020 | Gross et al. |
| 10,929,776 | B2 | 2/2021 | Gross et al. |
| 10,937,114 | B2 | 3/2021 | Franklin, Jr. et al. |
| 11,042,428 | B2 | 6/2021 | Gross et al. |
| 11,055,396 | B2 | 7/2021 | Gross et al. |
| 11,255,894 | B2 | 2/2022 | Wetherbee et al. |
| 11,392,786 | B2 | 7/2022 | Gross et al. |
| 2003/0061008 | A1 | 3/2003 | Smith et al. |
| 2008/0140362 | A1 | 6/2008 | Gross et al. |
| 2008/0252309 | A1 | 10/2008 | Gross et al. |
| 2008/0252441 | A1 | 10/2008 | McElfresh et al. |
| 2008/0256398 | A1 | 10/2008 | Gross et al. |
| 2009/0099830 | A1 | 4/2009 | Gross et al. |
| 2009/0125467 | A1 | 5/2009 | Dhanekula et al. |
| 2009/0306920 | A1 | 12/2009 | Zwinger et al. |
| 2010/0023282 | A1 | 1/2010 | Lewis et al. |
| 2010/0033386 | A1 | 2/2010 | Lewis et al. |
| 2010/0161525 | A1 | 6/2010 | Gross et al. |
| 2010/0305892 | A1 | 12/2010 | Gross et al. |
| 2010/0306165 | A1 | 12/2010 | Gross et al. |
| 2012/0030775 | A1 | 2/2012 | Gross et al. |
| 2012/0111115 | A1 | 5/2012 | Ume et al. |
| 2013/0157683 | A1 | 6/2013 | Lymberopoulos et al. |
| 2015/0137830 | A1 | 5/2015 | Keller, III et al. |
| 2016/0098561 | A1 | 4/2016 | Keller et al. |
| 2017/0163669 | A1 | 6/2017 | Brown et al. |
| 2018/0011130 | A1 | 1/2018 | Aguayo Gonzalez et al. |
| 2018/0349797 | A1 | 12/2018 | Garvey et al. |
| 2019/0102718 | A1 | 4/2019 | Agrawal |
| 2019/0163719 | A1 | 5/2019 | Gross et al. |
| 2019/0196892 | A1 | 6/2019 | Matei et al. |
| 2019/0197145 | A1 | 6/2019 | Gross et al. |
| 2019/0237997 | A1 | 8/2019 | Tsujii et al. |
| 2019/0243799 | A1 | 8/2019 | Gross et al. |
| 2019/0286725 | A1 | 9/2019 | Gawlick et al. |
| 2019/0324430 | A1 | 10/2019 | Herzog et al. |
| 2019/0378022 | A1 | 12/2019 | Wang et al. |
| 2020/0125819 | A1 | 4/2020 | Gross et al. |
| 2020/0144204 | A1 | 5/2020 | Keller, III et al. |
| 2020/0201950 | A1 | 6/2020 | Wang et al. |
| 2020/0242471 | A1 | 7/2020 | Busch |
| 2021/0081573 | A1 | 3/2021 | Gross et al. |
| 2021/0158202 | A1 | 5/2021 | Backlawski et al. |
| 2021/0174248 | A1 | 6/2021 | Wetherbee et al. |
| 2021/0270884 | A1 | 9/2021 | Wetherbee et al. |
| 2022/0121955 | A1 | 4/2022 | Chavoshi et al. |

OTHER PUBLICATIONS

Patent Cooperation Treaty (PCT), International Search Report and Written Opinion issued in PCT International Application No. PCT/US2021/013633 having a date of mailing of May 6, 2021 (10 pgs).
Huang H, et al. "Electronic counterfeit detection based on the measurement of electromagnetic fingerprint," Microelectronics Reliability: An Internat . Journal & World Abstracting Service, vol. 55, No. 9, Jul. 9, 2015 (Jul. 9, 2015) pp. 2050-2054.
Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.
Patent Cooperation Treaty (PCT), International Search Report and Written Opinion issued in PCT International Application No. PCT/US2021/014106 having a date of mailing of Apr. 26, 2021 (9 pgs).
Patent Cooperation Treaty (PCT), International Search Report and Written Opinion issued in PCT International Application No. PCT/US2021/015359 having a date of mailing of Apr. 9, 2021 (34 pgs).
Dickey et al.; Checking for Autocorrelation in Regression Residuals; pp. 959-965; Proceedings of 11th Annual SAS Users Group International Conference; 1986.
Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.
Kenny Gross, Oracle Labs; MSET2 Overview: "Anomaly Detection and Prediction" Oracle Cloud Autonomous Prognostics; p. 1-58; Aug. 8, 2019.
Whisnant et al.; "Proactive Fault Monitoring in Enterprise Servers," IEEE—International Multiconference in Computer Science & Computer Engineering (Jun. 27-30, 2005) 11 pgs.
Gross, K. C. et al., "Application of a Model-Based Fault Detection System to Nuclear Plant Signals," downloaded from https://www.researchgate.net/publication/236463759; Conference Paper: May 1, 1997, 5 pages.
US Nuclear Regulatory Commission; "Technical Review of On-Line Monitoring Techniques for Performance Assessment," vol. 1, Jan. 31, 2006.
Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.
Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.
Wald, A, "Sequential Probability Ratio Test for Reliability Demonstration", John Wiley & Sons, 1947.
Abebe Diro et al.; A Comprehensive Study of Anomaly Detection Schemes in IoT Networks Using Machine Learning Algorithms; pp. 1-13; 2021; downloaded from: https://doi.org/10.3390/s21248320.
Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.
Choi Kukjin et al: "Deep Learning for Anomaly Detection in Time-Series Data: Review, Analysis, and Guidelines", IEEE Access, IEEE, USA, vol. 9, Aug. 26, 2021, (23 pgs).
Gross Kenny et al: "AI Decision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.
John R. Boyd, "Destruction and Creation", downloaded from: https://www.coljohnboyd.com/static/documents/1976-09-03__Boyd_John_R__Destruction_and_Creation.pdf; dated Sep. 3, 1976; pp. 1-9.

(56) References Cited

OTHER PUBLICATIONS

M. Robiul Hoque et al., Development of Middleware Architecture to Realize Context-Aware Service in Smart Home Environment; from Article in Computer Science and Information Systems—Jun. 2016, pp. 1-27.
Jens Rasmussen, Skills, Rules, and Knowledge; Signals, Signs, and Symbols, and Other Distinctions in Human Performance Models; from: IEEE Transactions on Systems, Man, and Cybernetics, vol. SMC-13, No. 3, May/Jun. 1983; pp. 257-266.
Kenneth Baclawski et al., Formalization of Situation Awareness, Eleventh OOPSLA Workshop on Behavioral Semantics, 2003, pp. 1-15.
Kenneth Baclawski et al., Ontology Summit 2018 Communiqué: Contexts in Context, Applied Ontology 13, Jul. 2018, pp. 1-20.
Kenneth Baclawski et al., Use Cases for Evaluation of Machine Based Situation Awareness, Conference on Cognitive and Computational Aspects of Situation Management, Apr. 1, 2019, pp. 1-7.
Anind K. Dey, Understanding and Using Context, Personal and Ubiquitous Computing 5, Feb. 2001, 4-7.

AUTONOMOUS SITUATION AWARENESS WITH AMBIENT AND REFLEXIVE CONTEXT AND ANOMALY-DRIVEN PREDICATES

FIELD

Adaptive control systems, for example, systems automatically adjusting themselves to improve performance according to some preassigned criterion.

BACKGROUND

Situation awareness (SA) technology is generally intended to collect information to enable informed decision-making. Existing SA solutions may not be extensible to handle the challenges posed by exponentially increasing numbers of sensors used to monitor ever more complex engineering assets. For example, as the number of sensors for assets continues to increase, the flood of information can cause situation awareness problems for Human-in-the-Loop (HITL) supervisory control. Accordingly, there is a need for improved SA techniques to address the sensor-driven flood of information.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
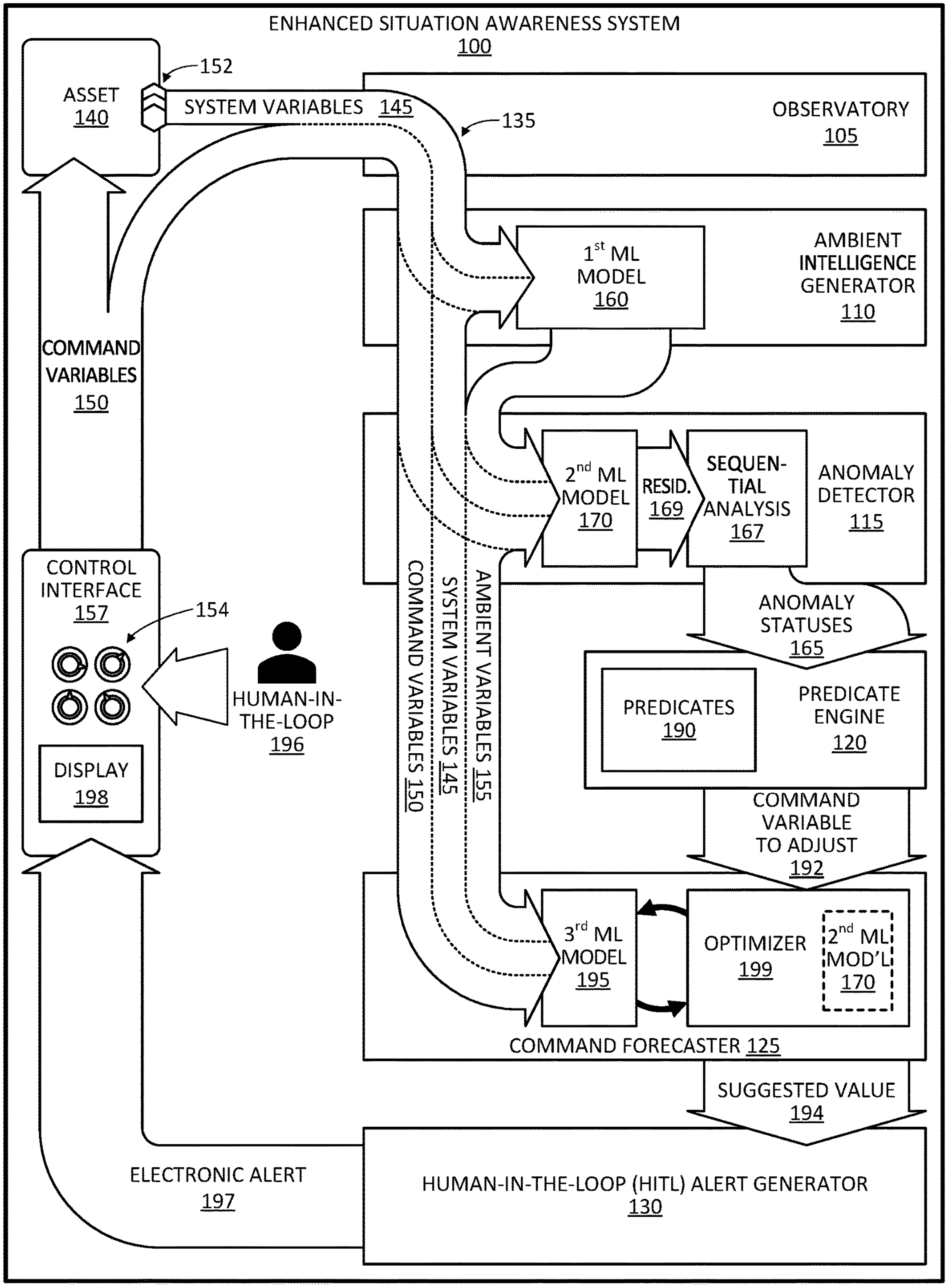
FIG. 1 illustrates one embodiment of an enhanced situation awareness system that is associated with autonomous situation awareness based on ambient intelligence and permuted binary-state predicate classification.

Systems, methods, and other embodiments are described herein that provide autonomous situation awareness based on ambient intelligence and permuted binary-state predicate classification. In one embodiment, an enhanced situation awareness system integrates autonomous ambient intelligence, reflexive context awareness, and sequential probability ratio test (SPRT)-based predicate disambiguation in a framework resembling a Rasmussen situation awareness framework. (The Rasmussen situation awareness framework is described in Rasmussen, J. *Skills, Rules, and Knowledge: Signals, Signs, and Symbols, and Other Distinctions in Human Performance Models*, IEEE Transactions on Systems, Man, and Cybernetics, SMC-13, 257-266 (1983)). The enhanced situation awareness system is configured to provide ambient and reflexive context awareness and anomaly-driven predicates in an autonomous situation awareness system. The enhanced situation awareness system operates to reduce a flood of information about a situation down to relevant information and recommended actions. In this way, the enhanced situation awareness system as described herein mitigates, prevents, or otherwise avoids causing cognitive overload when providing situation awareness information for human-in-the-loop (HITL) supervisory control.

In one example, the enhanced situation awareness system autonomously expands knowledge of a present state of an asset with intelligence about the influence of the ambient environment in which the asset operates. The enhanced situation awareness system provides context for control actions with ML predictions of future states of asset controls based on historical reactions of the asset to the control actions. The enhanced situation awareness system automates the control actions using ML anomaly detection to drive predicates for taking the control actions. In this way, the enhanced situation awareness system accounts for the influences of the ambient environment, considers reflexive behavior of the asset in response to the control actions, and automates control decisions.

In one embodiment, the enhanced situation awareness system improves over existing situation awareness technology by accounting for the effect of ambient environment on the operation of an asset. In one embodiment, the enhanced situation awareness system improves over existing situation awareness technology by accounting for the reflexivity of the asset when recommending adjustments to controls of the asset. In one embodiment, the enhanced situation awareness system improves over existing situation awareness technology by automatically filtering out irrelevant information for a given situation and presenting information that is relevant to control decisions for the given situation. In one embodiment, the enhanced situation awareness system automatically generates a recommended control configuration to place the asset into a less risky situation.

Definitions

As used herein, the term "situation awareness" (SA) refers to the perception of the elements in the environment within a volume of time and space, the comprehension of their meaning, and the projection of their status in the near future. Situation awareness may also be referred to herein as "situational awareness".

As used herein, the term "context awareness" (CA) refers to automatic adaptation by a system to circumstances that form the setting in which the system is operating. In other words, context awareness indicates ability of a system to adjust its responses based the state of the environment surrounding the system. More generally, context awareness refers, in information and communication technologies, to a capability to take into account the situation of entities. Context awareness may also be referred to herein as "contextual awareness". Context awareness differs from situation awareness at least in part because context awareness applies information to affect the interpretation of a perceived situation, for example by deducing new information from available information.

As used herein, the term "asset" or "engineering asset" refers to a physical system, structure, device, machine, appliance, apparatus, or other physical construct; or a component or part thereof. Assets may include, for example, manufacturing equipment, engines, server computers, buildings, vehicles such as military and commercial ships, boats, submarines, aircraft, land/tactical vehicles, and a wide variety of other physical constructs that that generate or are affected by physical phenomena.

As used herein, the terms "stream" and "streaming" refer to transmittal, use, and receipt of data as a steady, continual flow (for example, at a sampling rate), allowing use of portions of the data to occur while the data is being received.

As used herein, the term "real-time" refers to substantially immediate operation that keeps pace with a throughput of a stream of data. In other words, a real-time process happens within a maximum latency that does not cause the throughput of a stream of data to be reduced.

As used herein, the term "latency" refers to a delay or an amount of time taken to process and/or transmit data. As used herein, the term "end-to-end latency" refers to latency incurred from a beginning point of a process to an end point of a process. For example, an end-to-end latency may be from arrival of an observation at a streaming ML estimation system through writing an estimate for the observation to an output stream.

As used herein, the terms "time series" and "time series signal" refer to a data structure in which a series of data points or readings (such as observed or sampled values) are indexed in time order. For convenience, a time series signal may be referred to herein simply as a "signal". In one embodiment, the data points of a time series may be indexed with an index such as a point in time described by a time stamp and/or an observation number. A time series may be considered one "column" or sequence of data points over multiple points in time from one of several sensors used to monitor an asset. For example, a time series is one "column" or sequence of observations over time from one of N variables (such as from one sensor of an aircraft engine, server computer, vehicle, or other asset).

As used herein, the term "vector" refers to a data structure that includes a set of data points or readings (such as observed or sampled values) from multiple time series at one particular point in time, such as a point in time described by a time stamp, observation number, or other index. A vector may therefore be considered one "row" of data points sampled at one point in time from all sensors used to monitor an asset. A vector may also be referred to herein as a "multivariate observation" or "observation" for short. For example, a vector is one row of observations from all N variables (such as from multiple (or all) sensors of an aircraft engine, server computer, vehicle, or other asset). These observations are concurrent observations.

As used herein with reference to data values, the term "concurrent" indicates that the data values share a time index. For example, in one multivariate observation of variables (e.g., for a set of system variables, a set of command variables, and a set of ambient variables), all data values in the observation describe the variables at one particular moment, and are associated with a time stamp in common.

As used herein, the term "time series database" refers to a data structure that includes multiple time series that share an index (such as a series of points in time, time stamps, time steps, or observation numbers) in common. In one embodiment, the time series database is one form of a collection of time series signals. From another perspective, the term "time series database" refers to a data structure that includes vectors or multivariate observations across multiple time series at a series of points in time. In other words, the time series database is a time series of vectors. As an example, time series may be considered "columns" of a time series database, and vectors may be considered "rows" of a time series database. A time series database is thus one type of a set of time series readings. For example, a database or collection of sensed amplitudes from sensors of an aircraft engine, server computer, vehicle or other asset may be arranged or indexed in order of a recorded time for the amplitudes, thus making a time series database of the sensed amplitudes.

As used herein, the term "residual" refers to a difference or error between a value (such as a measured, observed, sampled, or resampled value) and an estimate, reference, or prediction of what the value is expected to be. In one embodiment, the residual may be an unsigned magnitude of the difference, also referred to as an "absolute error." For example, a residual may be a difference between an actual, observed value and a machine learning (ML) prediction or ML estimate of what the value is expected to be by an ML model. The difference referred to is a mathematical difference, i.e., a value obtained by subtraction between estimated and actual values. In one embodiment, a time series of residuals or "residual time series" refers to a time series made up of residual values between a time series of values and a time series of what the values are expected to be.

As used herein, the terms "reflexive" and "reflexivity" refer to an automatic, time-delayed, and/or non-linear behavior of an asset in reaction to a change in system state. In general, reflex of the asset depends in a complicated, non-linear manner on system state, ambient conditions, and control configuration. Reflexive behavior is highly unpredictable in even moderately complex systems. Awareness of reflexive behavior of an asset provides important context for determining how to correct for a situation affecting the asset. Reflexive behavior of an asset following an interval after a control action may be inferred by a machine learning algorithm from prior observations of time periods following prior control actions. Occasionally, reflexivity may also be referred to herein as "reactivity".

It should be understood that no action or function described or claimed herein is performed by the human mind. No action or function described or claimed herein can be practically performed in the human mind. Any interpretation that any action or function described or claimed herein can be performed in the human mind is inconsistent with and contrary to this disclosure.

—Example Enhanced Situation Awareness System—

FIG. 1 illustrates one embodiment of an enhanced situation awareness system 100 that is associated with autonomous situation awareness based on ambient intelligence and permuted binary-state predicate classification. Enhanced situation awareness system 100 includes components for enhancing situation awareness for HITL control of assets. For example, enhanced situation awareness system 100 includes components that are configured to filter control options for relevance to a situation and provide ML-vetted settings for control responses to the situation. In one embodiment, enhanced situation awareness system 100 includes an observatory 105, an ambient intelligence generator 110, an anomaly detector 115, a predicate engine 120, a command forecaster 125, and a human-in-the-loop (HITL) alert generator 130.

In one embodiment, observatory 105 is configured to access a time series 135 of multivariate observations of an asset 140. The multivariate observations include present values (i.e., values that are current at the time a multivariate observation is formed) for (i) one or more system variables 145, and (ii) one or more command variables 150. In one embodiment, observatory 105 is configured to access the time series 135 of multivariate observations as a stream of observations. In one embodiment, the stream of multivariate observations are delivered as a stream directly or indirectly from one or more sensors 152 configured to sense physical phenomena associated with the asset 140. The system variables 145 describe a present operational status of an asset 140. The command variables 150 describe a current configuration of controls 154 of asset 140. Thus, an individual command variable indicates a setting of a particular control of an asset. For example, a command variable for throttle records a level at which a throttle control of an asset is set. In one embodiment, observatory 105 is configured to load the multivariate observations into a buffer as they arrive at the observatory 105 in a real-time stream. When the buffer reaches a capacity, the observatory 105 is configured to provide the multivariate observations for processing as a batch by the remaining components of enhanced situation awareness system 100. In one embodiment, observatory 105 acts as an intake receiver of digital observables and/or symbolic observables, and produces an output of symbolic observables as a stream of multivariate observations of system variables 145 and command variables 150.

In one embodiment, ambient intelligence generator 110 is configured to supplement the multivariate observations (of system variables 145 and command variables 150) with estimated values of ambient variables 155. Ambient variables 155 are estimated from the multivariate observations by a first machine learning model 160. In one embodiment, first machine learning model 160 is a multiple input, multiple output (MIMO) model. In one embodiment, the first machine learning model is a multivariate state estimation technique (MSET) model—a particular type of MIMO model.

First machine learning model 160 is trained to estimate values for the ambient variables 155 that are consistent with sensed values for the ambient variables 155 that were sensed during reference operation of the asset. For example, the first machine learning model 160 is configured to produce estimated values of what the ambient variables 155 are for individual observations of the system variables 145 and command variables 150. The first machine learning model 160 has been configured during a training process to produce estimated values of what the ambient variables are based on observations of system variables 145, command variables 150, and sensed ambient variables collected from the asset during a period of reference operation of the asset 140. Reference operation of the asset refers to prior or historical operation of the asset 140 or another asset of similar type to the asset 140. In one embodiment, the reference operations are deemed to represent acceptable or otherwise nominal behavior of the asset.

In one embodiment, anomaly detector 115 is configured to determine anomaly statuses 165 of the system variables 145 based on a sequential analysis 167 of residuals 169. Residuals 169 include residuals between observed values of the system variables 145 and estimated values of the system variables 145. And, in one embodiment, residuals 169 also include residuals between observed values of the command variables 150 and estimated values of the command variables 150. The estimated values are estimated from the supplemented multivariate observations (of system variables 145, command variables 150, and ambient variables 155) by a second machine learning model 170. Thus, in one embodiment, second machine learning model 170 is thus configured to produce a time series of residuals 169 for the system variables 145 (and command variables 150).

In one embodiment, second machine learning model 170 is a MIMO model, such as an MSET model. The second machine learning model 170 is trained to estimate values for the system variables 145 (and command variables 150). The second machine learning model is trained, that is, configured, to produce estimates that are consistent with values obtained from reference operation of the asset 140. For example, second machine learning model 170 is configured to produce estimated values for a particular system variable or command variable based on observed values of ambient, system, and command variables in a multivariate observation other than the particular system or command variable.

Anomaly detector 115 is configured to determine anomaly statuses 165 of the system variables 145 from the residuals 169. Anomaly detector 115 is configured to determine the anomaly statuses 165 based on a sequential analysis 167 of the residuals 169. The sequential analysis 167 is a sequential hypothesis test of a series of the residuals 169 between the 2nd ML model estimates and present values for the system variables 145 (and command variables 150). In one embodiment, the sequential analysis 167 is a sequential probability ratio test (SPRT).

In one embodiment, predicate engine 120 is configured to evaluate the anomaly statuses 165 of the system variables 145 with one or more predicates 190. The one or more predicates 190 are associated with the controls 154 of asset 140. The predicate engine 120 evaluates the anomaly statuses 165 with the predicates 190 to select one command variable to adjust 192 out of the command variables 155. Where a predicate evaluates to a value of "TRUE," a control 154 associated with the predicate is to be adjusted. Predicates 190 are thus used for if-this-then-that (ITTT) decision making. For example, if a particular pattern of anomaly statuses occurs that cause the predicates to evaluate to a "TRUE" state, the command variable associated with the predicate should be adjusted. In other words, predicate engine 125 is configured to evaluate predicates 190 to select from among the command variables 150 which command variable to adjust 192 using the controls 154 of the asset 140.

In one embodiment, command forecaster 125 is configured to generate a suggested value 194 for the selected command variable to adjust 192. Command forecaster 125 generates suggested value 194 based on present and future values of the supplemented multivariate observations (of system variables 145, command variables 150, and ambient variables 155) using a third machine learning model 195. A third machine learning model 195 is trained to predict what the future values will be after one or more time intervals. As trained, third machine learning model 195 is configured to predict future values that that are consistent with reference operation of the asset. In particular, the predictions are consistent with values observed during reference operation of the asset after an interval following present values of the system variables, the ambient variables, and the command variables. In other words, the predicted values are values that would be expected following the interval, should the present values of the system, ambient, and command variables have occurred during reference operation. The third machine learning model 195 thus captures reflexive behavior of the asset 140 that was previously observed in response to a given configuration of controls in a given ambient state and system state.

In one embodiment, command forecaster 125 is configured to generate the suggested value 194 by iteratively adjusting the value of the selected command variable to adjust 192 until a loss function satisfies a threshold. For example, the adjustment may be in an increment away from a present value of the selected command variable to adjust 192. In one embodiment, the direction of the increment (that is, increasing or decreasing) may also be indicated by the predicate that selected the control. (For example, where sensed engine temperature and vibration are anomalous, a throttle may be selected by the predicate engine 120 as the variable to adjust 192, and may further indicate the direction: here, a decrease.) In one embodiment, the loss function is based on the future values of the system variables 145 that are generated by $3^{rd}$ ML model 195. Once the threshold is satisfied by the loss function, command forecaster 125 is configured to set the suggested value 194 to be the final value of the selected command variable 192 following the iterative adjustment.

In one embodiment, HITL alert generator 130 is configured to present the selected command variable to adjust 192 and the suggested value 194 for human-in-the-loop 196 confirmation. For example, HITL alert generator 130 is configured to generate an electronic alert 197 to adjust the controls 154 of the asset 140 to match the suggested value 194 for the selected command variable 192 to be adjusted. For example, the control interface 157 may parse electronic alert 197 to obtain the selected command variable 192 to be adjusted and the suggested value 194. In one embodiment, the control interface 157 may present the selected command variable 192 to be adjusted and the suggested value 194 for viewing in a display 198. And, in one embodiment, the control interface 157 may automatically adjust the values of the command variables 155 to control asset 140 and cause an operation status of asset 140 to be changed. In one embodiment, control interface 157 includes controls 156 that may be adjusted by the human-in-the-loop 196 to change the values of command variables 155. In one embodiment, the control interface 157 is configured to (a) emphasize particular ones of controls 154 of asset 140 with respect to other ones of controls 154, and (b) present recommended values—e.g., suggested value 194—for the particular ones of the controls 154.

Figure 3:
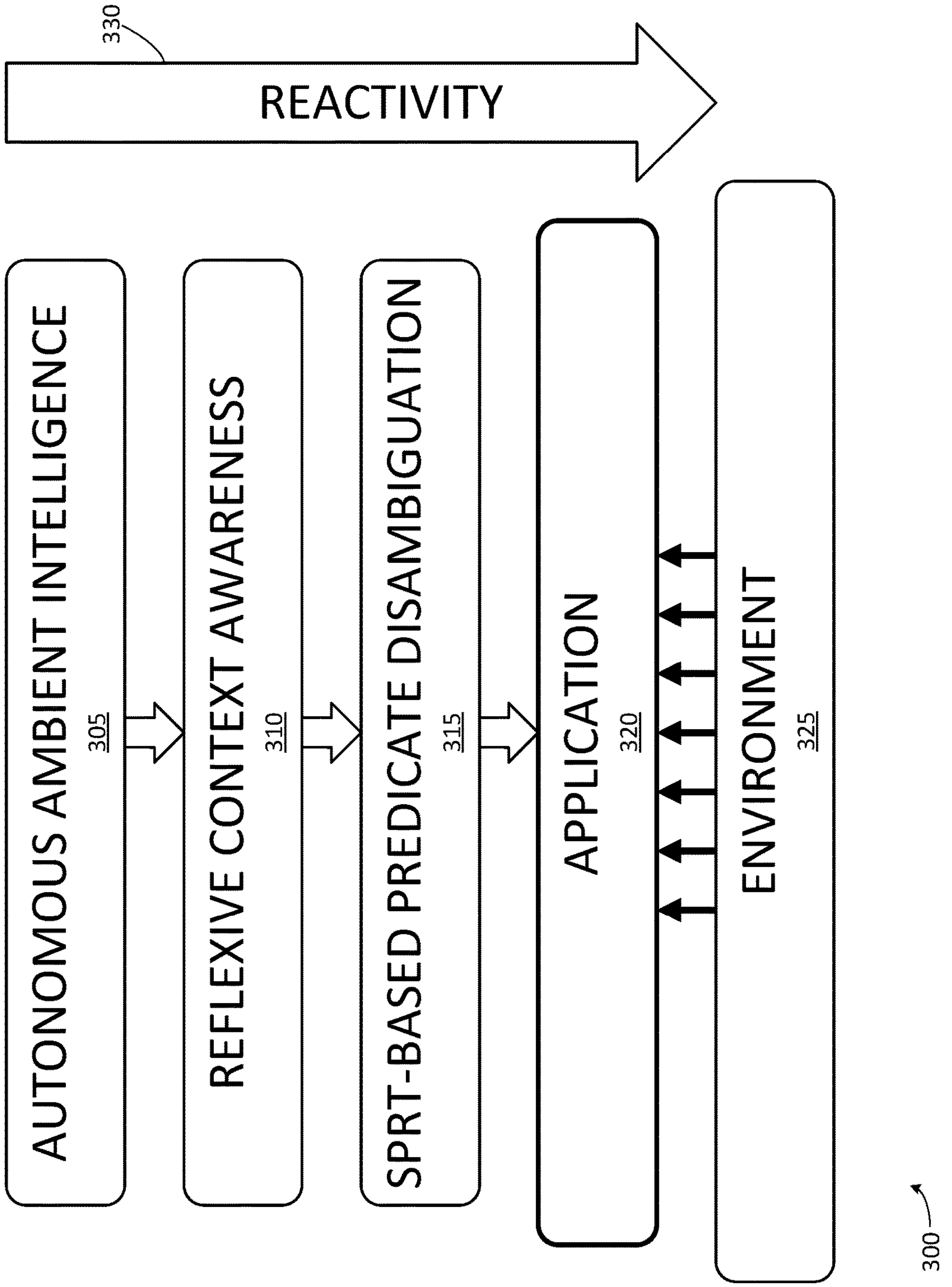
FIG. 3 illustrates a high-level illustrative dataflow consisting of three situation awareness elements in sequential order that are integrated according to a situation awareness framework.
Figure 4:
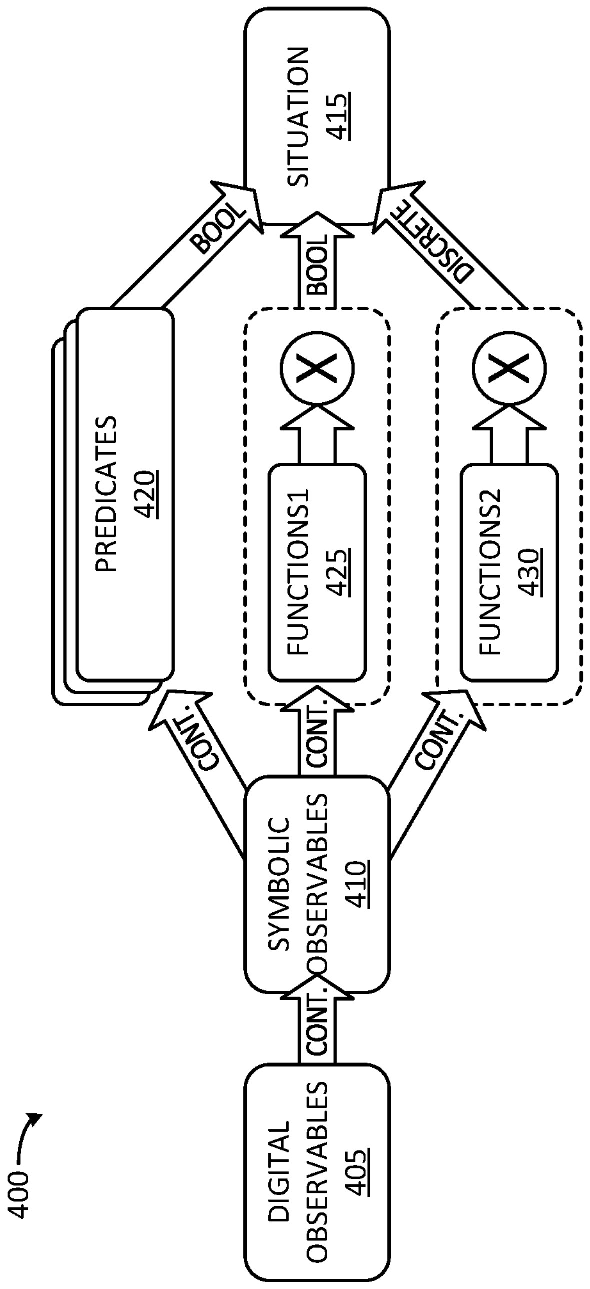
FIG. 4 illustrates one example situation awareness process associated with autonomous situation awareness based on ambient intelligence and permuted binary-state predicate classification.
Figure 5:
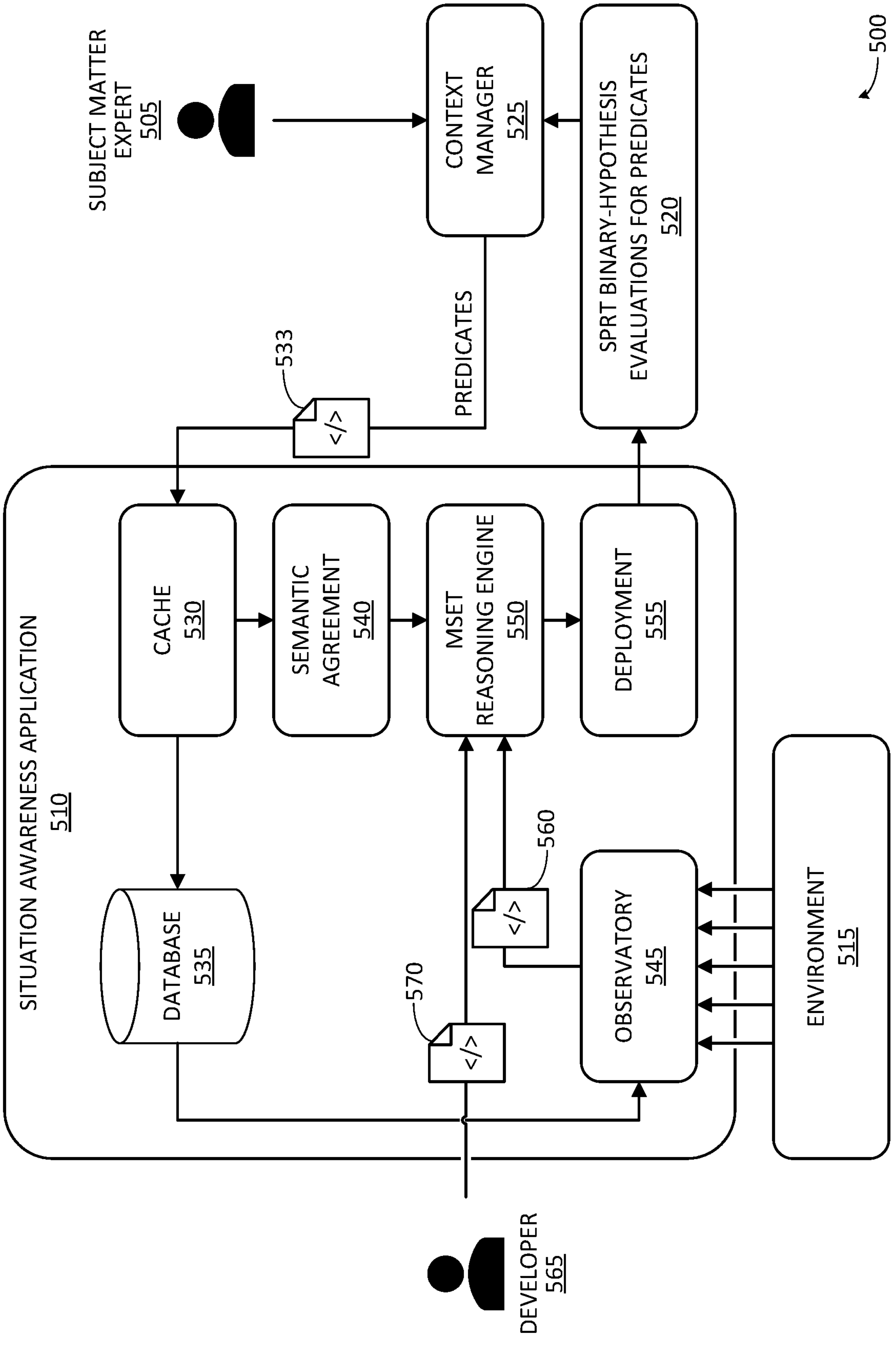
FIG. 5 illustrates one example of a situation awareness supervisory control algorithm that is enhanced as described herein.

Further details regarding enhanced situation awareness system 100 are presented herein. In one embodiment, operations of enhanced situation awareness system 100 will be described with reference to enhanced situation awareness method 200 of FIG. 2. In one embodiment, a high-level dataflow 300 of situation awareness elements associated with enhanced situation awareness system 100 is shown in FIG. 3. In one embodiment, a situation-awareness dataflow 400 associated with enhanced situation awareness system 100 is shown in FIG. 4. In one embodiment, an example supervisory control algorithm 500 for situation enhanced situation awareness system 100 that uses SPRT as a kernel for predicate decisions is shown in FIG. 5. In one embodiment, the enhanced situation awareness system 100 is implemented at least in part by an example computing system 600 shown in FIG. 6.

—Example Enhanced Situation Awareness Method—

Figure 2:
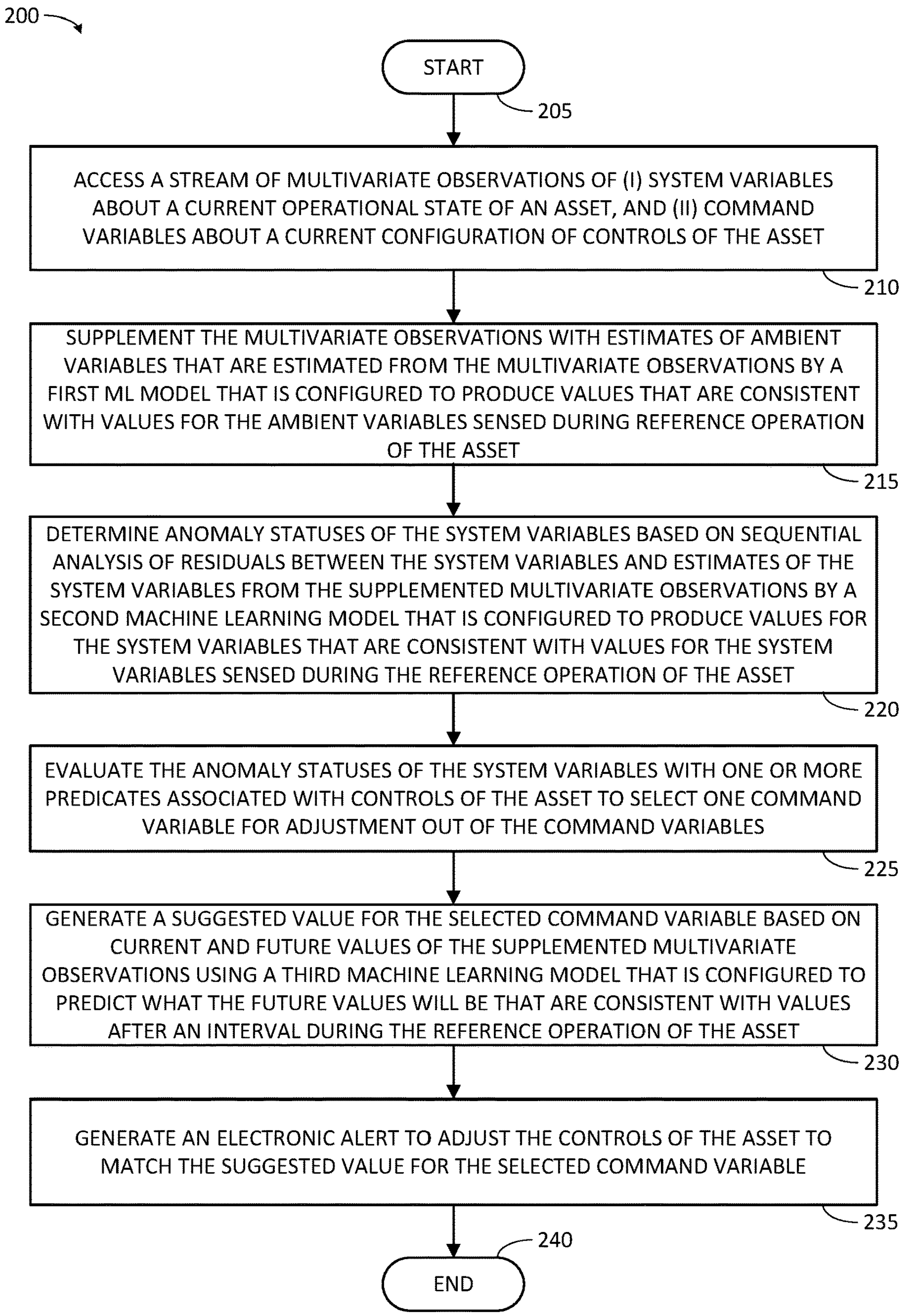
FIG. 2 illustrates one embodiment of an enhanced situation awareness method that is associated with autonomous situation awareness based on ambient intelligence and permuted binary-state predicate classification.

FIG. 2 illustrates one embodiment of an enhanced situation awareness method 200 that is associated with autonomous situation awareness based on ambient intelligence and permuted binary-state predicate classification. In one embodiment, as a general overview, enhanced situation awareness method 200 loads a stream of multivariate observations of an asset, including sensor readings of the asset systems and of observations of the command variables that control the asset. Sensor readings of ambient environment around the asset may be unavailable, inaccurate, or otherwise insufficient. Enhanced situation awareness method 200 uses a first machine learning model to generate estimated readings of the ambient environment from the system and command readings. Enhanced situation awareness method 200 then determines whether the values of the system and/or command variables are anomalous with reference to ML estimates of what the system variables are expected to be. Enhanced situation awareness method 200 determines which controls should be adjusted by providing the anomaly statuses of the system variables as inputs to predicate logics for making adjustments to controls.

Enhanced situation awareness method 200 also generates suggested values for controls indicated by the predicate logics. The suggested values show what the controls should be set to based on ML predictions or projections ahead of what the system variables will historically be following an interval of time. Predictions are performed for a variety of test values for the suggested value to determine which test value satisfies a threshold condition. This serves to accommodate reflexive behavior of the asset. From the suggested value and selected control to be modified, enhanced situation awareness method 200 generates an electronic alert for presentation to a human-in-the-loop that highlights the control that should be adjusted, as well as provides the suggested value as a recommendation.

In one embodiment, enhanced situation awareness method 200 initiates at START block 205 in response to an enhanced situation awareness system (such as enhanced situation awareness system 100) determining one or more of (1) that a enhanced situation awareness system has been instructed to monitor a stream of multivariate observations of an asset; (2) that an instruction to perform enhanced situation awareness method 200 has been received; (3) a user or administrator, such as a human-in-the-loop at a control interface for the asset, has initiated enhanced situation awareness method 200; (4) it is currently a time at which enhanced situation awareness method 200 is scheduled to be run; (5) one or more multivariate observations of the asset, the ambient environment around the asset, and/or the control state of the asset has been received by enhanced situation awareness system 100; or (6) enhanced situation awareness method 200 should commence in response to occurrence of some other condition. In one embodiment, a computer system configured by computer-executable instructions to execute functions of enhanced situation awareness system. Following initiation at START block 205, enhanced situation awareness method 200 proceeds to block 210.

At block 210, enhanced situation awareness method 200 accesses a stream of multivariate observations of (i) system variables about a present operational state of an asset and (ii) command variables about a present configuration of controls of the asset. In short, enhanced situation awareness method receives an ongoing flow of observations or "snapshots" of what the values of the system variables and the command variables are at a moment in time, with the observations spaced apart by an interval of time.

In one embodiment, enhanced situation awareness accesses the stream of multivariate observations by detecting and storing the observation in timestamp order as the observations arrive from a streaming source, such as a sensor system. For example, enhanced situation awareness method 200 is subscribed to (or otherwise configured to detect) the stream of multivariate observations. Upon detection of an arriving multivariate observation, enhanced situation awareness method 200 transfers the multivariate observation into memory and/or storage. For example, the observation may be transferred into a streaming buffer for storage in a time series data structure. In one embodiment, the multivariate observations in the time series arrive as a live stream of observations of the asset in real time.

The multivariate observations record contemporaneous values of a plurality of variables. The multivariate observations of the system variables are from sensors that monitor physical phenomena of the asset, such as engine temperature, heading, etc. The collective physical phenomena occurring in or around the object may also be referred to as an operational state of the asset. The multivariate observations of the command variables are collected from present input command states of controls, such as throttle, rudder, etc. The stream of multivariate observations may be considered to be a time series of multivariate observations. The stream of multivariate observations arrives at a real-time pace from the asset, providing a present description of the operational state and control configuration of the asset.

In one embodiment, a sensor system that is configured to sense physical phenomena associated with the asset delivers the stream of multivariate observations. Sensors that are part of the sensor system are positioned to monitor particular physical phenomena associated with the asset and components of the asset. In one embodiment, the sensor system provides raw or native output of individual sensors (or of data acquisition units that convert analog output from sensors to digital output). The native output of the sensors may be considered "digital observables" as described herein. The sensor outputs are repeatedly sampled at an interval to form the series of multivariate observations. The multivariate observations may be considered "symbolic observables" as described herein. The interval between multivariate observations is the sampling rate of the streaming time series of multivariate observations.

In one embodiment, the sensor system is also configured to sense a present configuration of controls of the asset. For example, where a control is analog, an input sensor such as a potentiometer, rotary encoder, joystick, contact switch translates a control setting to an analog control signal. And, an analog-to-digital converter reads the analog control signal from the control and converts the analog control signal to a digital value for a command variable associated with that control. A command variable associated with a control is a digital value that describes a configuration of the control. For example, where an analog knob is turned to a level of 5, the corresponding command variable for the control may have a value of 5. Where a control is digital, the control directly adjusts the value of the command variable for the control. For example, the sensor system may read or copy the present digital value for the command variable. The values for the command variables may be recorded in the multivariate observation alongside contemporaneous values for the system variables. Thus, a multivariate observation records values as of a particular time stamp for the system variables and the command variables.

In one embodiment, the sensor outputs further are sampled at particular ranges of interest, in addition to being sampled at the interval. For example, enhanced situation awareness method 200 may sample one or more particular frequency ranges of one broad-spectrum vibration sensor output. Thus, in one embodiment the stream of multivariate observations is generated by converting the digital observables of raw sensor readings to symbolic observations of individual frequencies within the sensor observations.

Thus, in one embodiment, enhanced situation awareness method 200 accesses a stream of multivariate observations of system variables and command variables by subscribing to a stream of multivariate observations from sensors associated with asset components and asset controls, detecting the multivariate observations as they arrive, storing the observations in an ongoing time series data structure. In one embodiment, the activities of block 215 are performed by sensors 152, control interface 157, and observatory 105.

At block 215, enhanced situation awareness method 200 supplements the multivariate observations with estimates of ambient variables. The estimates are values for ambient variables that are estimated from the multivariate observations by a first machine learning model (such as $1^{st}$ ML model 160). The first machine learning model is trained to estimate values for the ambient variables that are consistent with sensed values for the ambient variables sensed during reference operation of the asset. The machine learning estimates of the ambient variables are based on concurrent values of the system variables and the command variables. The ambient variables are about a present operating environment around the asset. For example, the ambient variables may describe levels of temperature, relative humidity, vibration, wind, altitude, etc. in the area surrounding the asset.

Supplementing the multivariate observations in this way allows enhanced situation awareness method 200 to add intelligence or knowledge about the environmental conditions surrounding the asset without using dedicated ambient environment sensors to obtain the intelligence. Enhanced situation awareness method 200 instead derives the ambient conditions from the behavior of the asset using machine learning. As a simple example, the ambient temperature and relative humidity (ambient variables) surrounding an operating diesel engine may be derived from the throttle setting (command variable) and sensed engine temperature, engine vibration, mass airflow, and nitrous oxide levels (system variables).

A machine learning model is trained on reference operation of the asset to infer the values of ambient variables from system and command variables. This first machine learning model may be referred to herein as an "ambient ML model". During reference operation, actual (that is, observed or sensed, not estimated) values for the ambient variables are recorded in multivariate observations of the reference operation along with the values for the system variables and command variables. The multivariate observations collected during the reference operation thus include the sensed values for ambient variables, and are used to train the ambient ML model to produce estimates for the ambient variables from sensed system and command variables. Thus, in one embodiment, the ambient ML model is trained with training observations of the reference operation of the asset. And, the training causes the ambient ML model to approximate (or generate estimates of) the sensed values of the ambient variables based on concurrent observed values of the system variables and command variables. Additional detail on training the ambient ML model is described elsewhere herein, for example under the heading "Overview of Multivariate ML Anomaly Detection".

Once generated, the values of the ambient variables are added to the multivariate observations to form supplemented multivariate observations. In one embodiment, the multivariate observations are vector data structures that include data positions for each of the system variables, each of the command variables, and each of the ambient variables. The data positions for the system variables and command variables are previously populated with the sensor and control readings. Initially, at the beginning of block 215, data positions for the ambient variables are null, filled with a placeholder value, or otherwise unpopulated.

Enhanced situation awareness method 200 then reads the values for the system variables and command variables from a multivariate observation, and provides them as inputs to the trained ambient ML model. Enhanced situation awareness method 200 executes the ambient ML model to generate estimates for the ambient variables from the input system and command variables. Enhanced situation awareness method 200 reads the estimated ambient variables output by the ambient ML model, and writes them to the data positions for the ambient variables in the multivariate observation. The multivariate observation is now supplemented with values for the ambient variables. This process may be repeated for a plurality of multivariate observations that arrive in the stream, thereby creating a stream of supplemented multivariate observations.

Thus, in one embodiment, enhanced situation awareness method 200 supplements the multivariate observations with estimates of ambient variables by first accessing an ambient ML model that has been trained to generate estimates of values for ambient variables from contemporaneous values for system and command variables. And for a series of multivariate observations, using the ambient ML model to estimate the values for the ambient variables from the system and command variables in an individual multivariate observation, and writing the estimated values for the ambient variables into the individual multivariate observation in positions for the ambient variables. Following these steps, the supplemented multivariate observations now include information about the ambient conditions surrounding the asset, even where there are no sensors configured to directly detect the ambient conditions. In one embodiment, the activities of process block 215 are performed by ambient intelligence generator 110, including $1^{st}$ (ambient) ML model 160.

At block 220, enhanced situation awareness method 200 determines anomaly statuses of the system variables. The anomaly statuses are ascertained based on sequential analysis of residuals between the system variables and ML estimates of the system variables. The ML estimates of the system variables are estimated from the supplemented multivariate observations by a second machine learning model (such as $2^{nd}$ ML model 170). The second machine learning model is trained to estimate values for the system variables that are consistent with the reference operation of the asset. The machine learning estimates for individual values of the system variables are based on concurrent values of others of the system variables, the ambient variables, and the command variables. The anomaly statuses of the system variables are thus determined based on residuals between the system variables and machine learning estimates of expected values for the system variables that are estimated from the supplemented multivariate observations.

The second machine learning model is trained on reference operation of the asset to infer the values of individual system variables from the values of other system variables. This second machine learning model may be referred to as a "system ML model". During the reference operation recorded for training data, actual values for the system variables, as well as actual values for command variables and ambient variables are recorded in multivariate observations of the reference operation of the asset. The multivariate observations of the system variables collected during the reference operation are used to train the system ML model to produce estimates for the system variables from other sensed system variables. Thus, in one embodiment, the system ML model is trained using training observations of the reference operation of the asset. And, the training causes the system ML model to approximate or estimate the value of individual system variables based on concurrent values observed for other system variables. In one embodiment, the ML model is further trained to include the concurrent values of the ambient and command variables as a basis for the estimates of the system ML model. Additional detail on training the system ML model is described elsewhere herein, for example under the heading "Overview of Multivariate ML Anomaly Detection".

In one embodiment, enhanced situation awareness method 200 generates estimates of the system variables. The system machine learning model accepts as inputs observed values for the system variables. Contemporaneous observations for the set of the system variables are input to the system ML model. In one embodiment, second machine model generates an estimate for each of the system variables. The estimate for each system variable is based on the values that were input for the other system variables. The estimation process is repeated for each observation in a time series of observations of the system variables, producing a time series of estimates of the system variables.

In one embodiment, enhanced situation awareness method 200 generates residuals between the observed and estimated values for each of the system variables. For each system variable, the system finds a difference (or, in one case, the absolute value of the difference) between the observed and estimated value for the system variable. The difference is found by subtracting the estimated value for a system variable from the observed value of the system variable (or alternatively, subtracting the observed value from the estimated value). The resulting difference (or absolute value of the difference) is the residual between the observed and estimated values. The residuals are determined for each system variable from the observed and estimated values for each system variable. Thus, the residuals are found for each system variable in an observation of the system variables. The process of finding residuals is repeated for each observation in a time series of observations of the system variables and a corresponding time series of estimates of the system variables, producing a time series of observations of residuals for the system variables. The time series of observations of residuals for the system variables may also be considered a collection of individual time series of residuals for each of the system variables.

In one embodiment, the sequential analysis applied by enhanced situation awareness method 200 to the individual series of residuals for the system variables is a sequential hypothesis test, such as the sequential probability ratio test (SPRT) or the cumulative sum test (CUSUM). SPRT involves two hypotheses, the null hypothesis denoted $H_0$, and the alternative hypothesis denoted $H_1$. SPRT has two threshold values, A and B. In SPRT, where the cumulative log likelihood ratio for a sequence of residuals falls below A, the test stops and accepts the null hypothesis $H_0$. Accepting the null hypothesis $H_0$ indicates a first anomaly status for the sequence of residuals between the observed and estimated values for a variable in which the behavior of the variable is not anomalous: a no-anomaly state. In SPRT, where the cumulative log likelihood ratio for a sequence of values exceeds B, the test stops and accepts the alternative hypothesis $H_1$. Accepting the alternative hypothesis $H_1$ indicates a second anomaly status for the sequence of residuals between the observed and estimated values for a variable in which the behavior of the variable is anomalous: an anomaly state. A third anomaly status—an indeterminate state—occurs where neither the null hypothesis $H_0$ nor the alternative hypothesis $H_1$ can yet be accepted (because the cumulative log likelihood ratio remains between threshold values A and B). In this case sampling continues until H0 or H1 gets accepted.

The anomaly statuses of the system variables are then recorded for subsequent analysis by the predicates. Following completion of the SPRT test, enhanced situation awareness method 200 records the anomaly status as of the latest value of the sequence included in the test. For example, enhanced situation awareness method 200 may write the anomaly status for a variable resulting from the SPRT analysis to an anomaly status data structure. The anomaly status data structure records an anomaly status in association with the variable that was analyzed by the SPRT. In one embodiment, the anomaly status data structure is a vector data structure including an anomaly status field for each of the system variables. Or, more generally, the anomaly status data structure may include an anomaly status field for each of the variables estimated by the system ML model and evaluated by SPRT, such each of the system, command, and ambient variables. In one embodiment, these anomaly status data structures are inserted into a time series, indexed in common with the time series of multivariate observations. In one embodiment, there is one anomaly status data structure, and prior anomaly status values for each variable are overwritten with present values generated by the SPRT analysis.

Thus, in one embodiment, enhanced situation awareness method 200 determines anomaly statuses of the system variables by training (configuring) a system ML model to generate machine learning estimates of the system variables based on training data recorded during reference operation of the asset; using the system ML model to generate the ML estimates of the system variables from the observed values of the system variables; generating residuals between the observed and estimated values; analyzing the residuals with a sequential hypothesis test to detect anomaly statuses of the system variables that indicate whether or not a value for the system variable is outside of an expected range; and recording or storing the anomaly statuses of the system variables. The anomaly statuses may then be used as inputs to predicate logic to determine which control(s) should be adjusted to correct the anomaly. In one embodiment, the activities of block 220 are performed by anomaly detector 115, including $2^{nd}$ ML model 170 and sequential analysis 167.

At block 225, enhanced situation awareness method 200 evaluates the anomaly statuses of the system variables with one or more predicates. The predicates are associated with controls of the asset. The evaluation operates to select one command variable for adjustment out of the command variables. That is, the results of the predicate evaluation indicate which command variable out of the available command variables is best to adjust to correct the anomaly.

As used herein, a predicate is a logic function that produces a true-or-false (Boolean) result based on the values of input variables. In one embodiment, the predicates as used herein are configured to accept, as initial input variables (arguments), anomaly statuses of specified system variables. The predicates may be evaluated by loading values of the anomaly statuses of the particular system variables that were specified, and executing the computing process described by the predicate to produce the Boolean result. As a simple example, a predicate may express the ITTT decisioning statement, if the speed of the asset is anomalous and no other variables are anomalous, then adjust throttle downward is TRUE, otherwise, FALSE. (The suggested value to which the throttle is to be adjusted downward when the statement evaluates to TRUE is determined subsequently in block 230.) Note that here, the input arguments of the predicates are SPRT-generated anomaly statuses.

In one embodiment, the predicates may be interconnected as a network or matrix of predicates. For example, the Boolean outputs of one or more predicates may be accepted as input arguments for other predicates.

The use of SPRT-generated anomaly statuses as initial inputs to the predicates disambiguates the results of the predicates. False alert probabilities (FAPs) and missed alert probabilities (MAPs) are reduced by use of SPRT-generated anomaly statuses as inputs to the predicates. The predicates are thus rendered more accurate than simple threshold measures of the system variables. Moreover, the FAP and MAP of individual anomaly statuses may be set independently. The accuracy of the detections is thus adjustable by adjusting target values for MAP and/or FAP. For example, FAP and MAP may be set more tightly for safety-critical applications. Further, the SPRT-based detections enable statistically earliest detection of an abnormal system condition in the asset, for a given pre-specified target value ($\alpha$) for FAP and a given pre-specified target value ($\beta$) for MAP. In one embodiment, the detection of the abnormal system condition is made at the earliest decision that satisfies the target values $\alpha$ and $\beta$ for FAP and MAP, respectively.

In one embodiment, predicates approve a particular operational state of an asset as "safe" to continue under a particular control configuration. In such safe situations, the system may just continue monitoring the operational state of the asset. Or, in one embodiment, predicates reject the operational state of the asset as "unsafe" to continue under a particular control configuration. In such unsafe situations, the system will indicate correction and/or prevent other control actions from being taken. This occurs with improved accuracy and promptness due to the SPRT-based anomaly inputs to the predicates.

The predicates are associated with controls of the asset. In particular, the predicates are used for ITTT decisioning with respect to individual controls. Decisioning, or decision-making, refers to making a decision as to whether or not to perform an action, and the extent to which the action is to be performed. The Boolean results from the predicates drive the choice of whether or not to adjust a particular control. (The extent to which the control is to be adjusted is handled below at block 230). For example, a "true" result in a predicate that decides on whether to "reduce throttle" will select for adjustment a command variable for a throttle of the asset.

Interlocks (or interlock recommendations) for operating a particular control may also be governed by the predicates. For example, a "false result" in a predicate that decides on whether a compartment is safe to enter will prevent adjustment to a command variable that would grant access to the compartment. In another example, in a chemical refinery, SPRT-based detection of abnormal vibration by a failing water pump in a cooling system for a vessel along with SPRT-based detection of abnormal temperature or pressure increase in the vessel may be used to prohibit operating a control to direct a flow of flammable or explosive fluid into the vessel and/or recommend that a control to drain the contents of vessel be operated.

The predicates thus may govern activation or adjustment of a wide variety of asset systems. For example, the predicate outputs may indicate adjustment to throttle; adjustment to steering, rudder, ailerons, or other motion systems; adjustment of valve positions or pump speeds; or other adjustments to change the operational state of the asset.

In one embodiment, the predicates are configured to register inputs of the no-anomaly state (null hypothesis) as a “False” value. And, the predicates are configured to register inputs of the anomaly state (alternative hypothesis) as a “True” value. In one embodiment, the predicates are configured to disregard inputs of the indeterminate state (neither hypothesis accepted), or to consider them to have a “False” value.

In one embodiment, the enhanced situation awareness method 200 loads the anomaly statuses of the system variables (produced at block 220) for a given observation of the system variables (that is, a given point in time), and supplies them as arguments to the functions for the predicates. In one embodiment, not all the predicate functions use the anomaly statuses for all system variables. The particular anomaly states used as arguments by the predicate functions are read and input to the predicate functions. The predicate functions are executed to produce output or results of the predicate function from the input anomaly statuses and/or other predicate results. Predicate functions that are downstream of others in a predicate network do not execute until the output of upstream predicate functions are available as arguments for the downstream functions.

The final results (that is, the results from a subset of the predicates that indicate whether or not a particular command variable is to be adjusted) of the predicate network are stored. For example, the results are written into a predicate state data structure, such as a vector data structure. The predicate state data structure may include a predicate result field for each of the command variables. The fields of the predicate state data structure are configured for storing the values output by the predicates that are associated with the command variables. In one embodiment, these predicate state data structures are inserted into a time series that is indexed in common with the time series of multivariate observations. In one embodiment, there is one predicate state data structure, and prior predicate result values from each predicate are overwritten with present predicate result values generated by executing the network or matrix of predicates on present values of the anomaly statuses.

The predicate results indicate which controls (and associated command variables) have been selected to be adjusted by the human in the loop. In one embodiment, the predicate network is configured such that only one command variable is selected for adjustment. In one embodiment, the predicate network is configured such that multiple command variables may be selected for adjustment.

Enhanced situation awareness method 200 thus evaluates the anomaly statuses with predicates associated with the controls of the asset to select one of the command variables to be adjusted by loading the SPRT anomaly statuses for the system variables and a network (or matrix) of predicate functions; providing the anomaly statuses as input arguments to the predicates in the network; executing the predicates in the network on the provided anomaly statuses to produce output results of the predicates, and store the output of those of the predicates that specifically indicate whether to adjust particular controls in a predicate state data structure. The predicate state data structure may be subsequently read to determine which one (or more) of the command variables has been selected to be adjusted. In one embodiment, the activities of block 225 are performed by predicate engine 120 (including individual functions for predicates 190).

At block 230, enhanced situation awareness method 200 generates a suggested value for the selected command variable. The suggested value for the selected command variable is generated based on present and future values of the supplemented multivariate observations using a third machine learning model (such as 3rd ML model 195). In one embodiment, enhanced situation awareness method 200 generates a suggested value for the selected command variable based on machine learning predictions of future values of the system variables, the ambient variables, and the command variables. The third machine learning model is trained to predict what the future values will be after an interval. The third machine learning model is trained to predict future values that are consistent with values sensed after the interval during the reference operation of the asset. For example, the predictions are consistent with reference operation of the asset after an interval following present values of the system variables, the ambient variables, and the command variables.

The third machine learning model is trained on reference operation of the asset to infer future values of individual system variables from present values of system, command, and ambient variables. This third machine learning model may be referred to as a “forecast ML model”. The forecast ML model is configured to project values of a particular system variable ahead by an increment of time. In other words, the forecast ML model looks ahead to determine what sensor readings are expected to be following the increment of time from the present.

During the reference operation recorded for training data, values for the system, command and ambient variables are recorded in a time series of multivariate observations of the reference operation of the asset over a period of time. These training observations of the asset are used to train the forecast ML model to predict values of the system variables. In one embodiment, the period of time for the reference operation is many times longer than the increment of time for which the forecast ML model is configured to look ahead.

During training of the forecast ML model, the observed values of the system variables are offset forward by the increment of time, and used as the target values for training. Look-ahead increment i thus indicates temporal spacing between the final value (at a time t) in a sequence of input values (up through time t) and target values in the reference operation data used for training. For example, for a look-ahead increment of i seconds, the sequence of values of the system, ambient, and command variables in a look-behind window from an initial time t' preceding time tup through time t are provided as inputs to the forecast ML model. And, the values of the system variables at time t+i are provided as target values. The training process adjusts the configuration of the forecast ML model to cause the outputs of the system values to match the target values.

The training process is performed for a plurality of training observations of the system variables, ambient variables, and command variables. The training process generally continues until a threshold condition is satisfied. For example, the threshold condition may be that the forecast ML model consistently predicts, from a sequence of input observations of actual values of the system, ambient, and command variables up until time t, an output observation for time t+i that matches the observation of actual values at time t+i. The predictions In this way, the forecast ML model learns or infers the reflexive behavior of the asset from the historical record of the reference operation. In this manner, the forecast ML model is configured to use a sequence of measured observations (vectors) in a look-behind window from time t−i up until time t to predict a subsequent observation at time t+i (e.g., at time t+1). In one embodiment, the sequence is a plurality of measured observations preceding and including an observation at time t.

The look-ahead or prediction increment i is sized appropriately for an application. Generally, for applications involving human-in-the-loop decisioning, the look-ahead increments are on the order of second(s) or larger (e.g., minutes, hours, or days). In one embodiment, multiple forecast ML models are created for multiple differing values of look-ahead increment i. For example, a set of four forecast ML models may look ahead 15 seconds, 1 minute, 5 minutes, and 15 minutes. More or fewer forecast ML models may be trained for look-ahead increments of interest for particular assets. In one embodiment, enhanced situation awareness method 200 may access a pre-specified set of one or more look-ahead increments from memory or storage, and train a forecast ML model for each look-ahead increment.

In one embodiment, once trained, a forecast ML model is configured to accept as inputs a sequence of observations of values for system, ambient, and command variables up to and including a present time t, and to predict an observation of future values for the system variables at a later time t+i. For example, the sequence of observations may be taken within a given look-behind window of time. In one embodiment, the look-behind window is some multiple m of the look ahead increment i, such that the look-behind window includes the sequence of observations between initial time t'=t−mi and time t. In one embodiment, the look-behind window is of approximately the same length of time as the look-ahead increment i (m≈1). For example, where the look-ahead increment is 15 seconds, the look-behind window includes a sequence of observations covering 10-20 (e.g., 15) seconds worth of observations preceding and up through time t. Other sizes of look-behind window may also be used for the forecast ML model. For example, depending on the asset being monitored, a larger look-behind window may be appropriate.

The forecast ML model may be used in a loss function in an optimization process. The optimization process operates to determine what value to suggest for an adjustment to the command variable that was selected to be adjusted in block 225. In one embodiment, a plurality of forecast ML models for multiple values of look-ahead increment i may be included in the loss function for the optimization process. Due to the reflexive behavior of the asset learned by the forecast ML model, the loss function is caused to changes continuously based on both the inputs and reflexive reaction of the asset to command/control adjustments.

In one embodiment, the optimization process permutes the values of the command variables selected for adjustment (by a binary state of true) by one or more predicates. The optimization process considers multiple candidate values of the selected command variable(s) for suggestion. For example, the optimization process may consider a series of adjustments to the selected command variable(s). Unsatisfactory values for the selected command variables are filtered out. The optimization process determines which of the candidate value for the selected command variable results in a satisfactory or future operational state for the asset following the reflexive response of the asset to the change in the command variable. In one embodiment, the satisfactory operational state is determined by minimizing a loss function, for example through an optimization process. In other words, the “satisfactory” operational state for the asset is a state for which the result of the loss function is least (or approaches least within a threshold). In one embodiment, the loss function is a cumulative error between future values of the system variables and ML estimates of what the future values of the system variables are expected to be, provided operation is consistent with the reference operation of the asset.

In one embodiment, where a single command variable is identified for adjustment in block 225, the optimization may be performed by bracketing algorithms which locate the minima of the loss function within a range of available values for the command variable (e.g., between minimum and maximum throttle, between full port and full starboard rudder, etc.), until no further improvements in the loss function results are available. For example, the Fibonacci search, Golden Section search, and Bisection search may be suitable. In one embodiment, where multiple command variables are identified for adjustment in block 225, the optimization may be performed by gradient/local descent optimization that repeatedly chooses a direction (defined by the multiple command variables) to move in the search space, and performing a bracketing search along the chosen direction to identify the minima of the loss function, until no further improvements in the loss function results are available. The stopping threshold condition for the optimization of the loss function, where no further improvement is considered to be available may be based on reaching a minimum available improvement. For example, the stopping threshold condition may be finding the point where further improvement in loss function is below a pre-determined amount or percentage, such as when further improvement to the loss function is less than 1% (such as less than 0.1%).

Various candidate values are thus provided as inputs to an optimization process that continues until a stopping threshold for the loss function is satisfied. An observation of values for the command variables that includes a candidate value for at least one of the command variables may be referred to herein as a “candidate configuration” of the command variables. In each iteration of the optimization loop, the present configuration of the command variables has been updated to a new candidate configuration.

In one embodiment, enhanced situation awareness method 200 determines future values for the system variables using the trained forecast ML model (e.g., 3$^{rd}$ ML model 195). For example, a forecast ML model trained for a look-ahead increment i accepts a sequence of observations of the present values of system, ambient, and candidate configuration of command variables preceding and up through time t as input, and predicts an observation of the future values of the system variables at future time t+i as output. Enhanced situation awareness method 200 then determines nominal values for the future values of the system variables using the trained system ML model (e.g., 2$^{nd}$ ML model 170) discussed in block 225. For example, a system ML model trained to estimate what contemporaneous values are expected to be accepts the observation of the future values of the system variables at future time t+i as input, and estimates an observation of nominal values of the system variables at future time t+i as output. Enhanced situation awareness method 200 then determines the residuals between the future value and nominal value for each variable.

Enhanced situation awareness method 200 then combines the residuals for the individual system variables to find a cumulative error, for example by summing the residuals for the system variables. In one embodiment, prior to summing, the residuals may be normalized by rescaling the residual values to be within the range of 0 and 1. For example, the residuals may be normalized by min-max normalization. The cumulative error (between the future values produced by the forecast ML model and estimates made by the system ML model) resulting from the summing of the residuals is used as the loss function result for the candidate configuration of command variables.

In one embodiment, multiple look-ahead increments $i_1$–$i_n$ are considered in the loss function. Training forecast ML models on the reference operation for multiple look-ahead increments captures the reflexive behavior of the asset at these various delays following a command state. Thus, in one embodiment, enhanced situation awareness method 200 determines future values for the system variables at the multiple look-ahead increments $i_1$–$i_n$ using corresponding forecast ML models 1–n that are respectively trained using a look-ahead increment $i_1$–$i_n$. For example, forecast ML models trained for look-ahead increments $i_1$–$i_n$ accept a sequence of observations of the present values of system, ambient, and candidate configuration of command variables up through time t as input, and predict observations of the future values of the system variables at future times $t+i_1$–$t+i_n$ as output. Estimates of nominal values for the predicted observations at the future times $t+i_1$–$t+i_n$ are then generated by system ML model, and residuals between the nominal and predicted values calculated. The residuals for the future times $t+i_1$–$t+i_n$ are then normalized and summed to produce the cumulative error used as the loss function. The cumulative error thus accounts for the reflexive behavior of the asset at a variety of future times.

Multiplicative weights may be applied to various components of the loss function to adjust the extent to which the component influences the overall result of the loss function. The influence of the various look-ahead increments may be weighted in the loss function according to importance or relevance of the increment to the particular anomaly. For example, in a situation requiring a rapid response (such as avoidance of a hazard in an aircraft) returning to nominal situations at a shorter look-ahead increment (such as t+1 seconds) may be weighted substantially more heavily than a longer look-ahead increment (such as t+60 seconds). This will cause the optimizer to emphasize candidate configurations that resolve the hazard quickly, with less regard to later stress on the aircraft. And, the influence of particular system variables may be weighted in the loss function according to importance or relevance of the variable to the particular anomaly. For example, in a situation where risk of damage is high (such as avoidance of a hazard by a ship), a collision warning variable may be weighted substantially more heavily than a variable for fuel consumption efficiency. This will cause the optimizer to emphasize resolving the risk of collision over inefficient use of fuel. The particular portions of the loss function to be weighted may be specified by the predicate indicating the command variables to be adjusted. In other words, the predicate activation will cause the system to select a particular loss function for optimizing the control response to the situation that caused the predicate to activate.

Thus, in one embodiment, enhanced situation awareness method 200 generates a suggested value for the selected command variable based on machine learning predictions of future values for the system variables following an interval by accessing a set of look-ahead increments, training forecast ML models to look ahead as far as specified by the increments. The trained forecast ML model captures reflexive behavior of the asset from training observations of the reference operation. Enhanced situation awareness method 200 then performs an optimization loop to choose a suggested value(s) for the command variables from among a series of candidate values. The optimization loop (i) generates future values of the system variables from present values of the system, ambient, and candidate configuration of the command variables using the forecast ML models; (ii) determines expected or nominal values for the future values using the system ML model; (iii) sums the residuals between the future values and the nominal values to determine the value of the loss function; and (iv) determines whether the loss function has been minimized and should therefore stop. The optimization process thus repeats to try a variety of candidate values for the selected command variable(s) until the candidate values cause the loss function to be minimized. The values of the selected command variables to be adjusted that are in the candidate configuration of command variables that is current at the time the loss function is minimized are then output as the suggested value(s). The suggested value (s) for the selected command variables may then be presented to the HITL for confirmation and/or control adjustment. Thus, the HITL will be provided with solutions that are pre-vetted by the optimizer to be the most likely to bring the asset back to a nominal condition at the relevant intervals in the future. In one embodiment, the activities of block 230 are performed by command forecaster 125 including 3$^{rd}$ ML model 195 and 2$^{nd}$ ML model 170.

At block 235, enhanced situation awareness method 200 presents the selected command variable and the suggested value for human-in-the-loop confirmation. For example, enhanced situation awareness method 200 may generate an electronic alert to adjust the controls of the asset to match the suggested value for the selected command variable. The alert may then be transmitted to a control interface for human in the loop confirmation.

In one embodiment, enhanced situation awareness method 200 presents the selected command variable(s) and the suggested value(s) for human-in-the-loop confirmation by generating and transmitting an electronic alert to a control interface. In one embodiment, the electronic alert is generated by composing and transmitting a computer-readable message including content describing the selected command variables and the suggested values. In one embodiment, the electronic alert indicates that an anomaly is occurring (or has occurred) in the asset, and recommends that a selected control(s) be set to the suggested value(s).

In one embodiment, the electronic alert includes an indication or description of the situation that will be avoided by making the suggested adjustments to the controls associated with the command variables. This description may be selected based on the predicate that has activated (that is, arrived at a Boolean result indicating a problem). For example, where the predicate is associated with adjusting controls to avoid a collision, the electronic alert may indicate that setting the controls to the suggested values will avoid a collision. In one embodiment, the activation of a predicate determines whether the electronic alert should be generated, or not. For example, where no predicates are activated by anomalous activity, no electronic alert is generated. And, where a predicate is activated by the anomalous activity, an electronic alert with guidance to correct the anomalous situation is issued.

In one embodiment, enhanced situation awareness method 200 employs a human-in-the-loop control interface configured to (a) emphasize a selected control of an asset with respect to other controls, and (b) present recommended values for the particular controls. In response to receiving the electronic message, the control interface is configured to extract the selected command variable(s) and the suggested value(s) from the electronic alert and show the selected command variable(s) and the suggested value(s) on the control interface. The selected command variable(s) and the suggested value(s) may then be viewed by the HITL. In one embodiment, in the control interface, enhanced situation awareness method 200 may emphasize the selected command variable in relation to other command variables, and display the suggested value for the selected command variable. In one embodiment, enhanced situation awareness method 200 emphasizes the selected command variable(s) in relation to other command variables in order to draw attention to the controls to be adjusted.

For example, the control interface may include a display associated with the control interface. The display may show the selected command variable(s) and the suggested value(s) in a text user interface or a graphical user interface. In the graphical user interface, the emphasis on command variables to be adjusted may be provided graphically. For example, the selected command variable may be shown enlarged, bolded, italicized, underlined, written in a color different from other variables, written in a font different from other variables, highlighted with a color, denoted by an adjacent graphic or animation, and/or otherwise modified to draw attention to the command variable that is selected for adjustment. Or, particular command variables to be adjusted and their suggested values may be shown in isolation from other command variables in the GUI, with other command variables not shown, for example in a pop-up window or dedicated screen for presenting the alerts.

In one embodiment, the HITL may view the recommendation and adjust the controls associated with the selected command variables to match the suggested values. In one embodiment, the graphical user interface is configured to accept HITL input to confirm or accept the suggested values, and in response, the control interface automatically adjusts the associated controls to match the selected values. In the graphical user interface, enhanced situation awareness method 200 presents the suggested value as a user-selectable option. For example, the suggested value may be shown in or adjacent to a graphical button, check box, radio button, dropdown menu, slider, or other user-selectable input element. Selection of the user-selectable option indicates user confirmation to change the value of the selected command variable to the suggested value. An alternative user-selectable option to cancel changing the value of the selected command variable may also be presented in the graphical user interface. In the graphical user interface, enhanced situation awareness method 200 accepts a user input that selects the selectable option to indicate the human-in-the-loop confirmation. In other words, the user may enter a keystroke, mouse click, or touchscreen tap to indicate selection of the user-selectable option to confirm setting the selected command variable to the suggested value.

In response to the selection of the option to confirm the suggested value, the enhanced situation awareness method 200 automatically adjusts the selected command variable to match to the suggested value. For example, where the selected command variable is for a digital control, enhanced situation awareness method 200 overwrites a present value of the selected command variable with the suggested value. And for example, where the selected command variable is for an analog control, enhanced situation awareness method 200 generates an analog control signal that corresponds to the suggested value. In one embodiment, the controls are electromechanically adjustable or manipulable manual controls. Here, enhanced situation awareness method 200 adjusts control levers, knobs, or buttons by electric motors (such as stepper motors), actuators, or other electromechanical devices to cause analog control signals to be adjusted to correspond to the suggested value. Enhanced situation awareness method 200 then transmits the adjusted value for the selected command variable to the asset to control the asset according to the adjusted value. As a simple example, a change to the throttle level of a motor is sent to an electronically actuated throttle mechanism, which adjusts fuel flow to match the adjusted value.

In another example, the control interface may include indicator lights or alphanumeric displays (or text or graphical user interface displays) that are associated with individual controls. An indicator light associated with a control selected to be adjusted may be illuminated, while indicator lights of other controls may remain un-illuminated. The alphanumeric display for a control may show the suggested value for the selected command variable that is associated with the control. The particular controls of the asset that are selected to be adjusted may be emphasized with respect to other controls by populating the displays associated with the controls to be adjusted, illuminating the indicator lights associated with the controls to be adjusted, or by activating other indicators. The attention of the HITL is thus directed to the controls associated with the selected command variables for adjustment and the suggested values for adjustment of the controls. The HITL may view the suggestion associated with an individual control and adjust the control to match the suggested value.

The alerts may be generated and presented for HITL confirmation in real time. Detection of an anomaly status (at block 220) in the stream of multivariate observations of the asset triggers a process that determines which command variable is to be changed and produces a suggested value for the command variable, which are transmitted for presentation to the HITL promptly upon generation. The alerts thus provide both a warning of a problem and a recommended solution simultaneously, in a live response to detection of the problem. This provides the HITL with an actionable choice to resolve the problem—accept or reject the suggested value(s) for the selected control(s)—practically as soon as the problem is detected.

This advantageous real-time delivery of actionable solutions that are pre-vetted by the optimizer defeat cognitive overload of the HITL. Even if the HITL does not choose to make the recommended adjustment of the controls to match the suggested values, the HITL is directed to controls that can be used to solve the detected problem. This is a substantial improvement over situation awareness systems that simply alert a HITL to a problem, bury the HITL in information about the state of the asset, and leave the HITL to come up with a solution without guidance or accommodation for reflexive response of the asset to control actions.

In one embodiment, the electronic alerts—and therefore the emphasis on the selected command variable and display of suggested values—are presented in real time. Here, real time operation indicates that the electronic alert with suggested corrective action is available to be presented in the control interface at a time substantially immediately following receiving readings of the system and command variables that trigger activation of a predicate. In one embodiment, as used herein "real-time" refers to substantially immediate operation that keeps pace with a throughput of a stream of data. In one embodiment, real-time operations are subject only to a minimal delay or latency that is acceptable in the context of live operation of the asset. For example, in substantially immediate real-time operation of enhanced situation awareness method 200, availability of the electronic alert is subject to a minimal delay or latency between receiving the readings of the system and command variables and transmission of electronic alert to correct these system and command variables.

Thus, in one embodiment, enhanced situation awareness method 200 presents the selected command variable and the suggested value for human-in-the-loop confirmation by generating an electronic alert that includes the selected command variable(s) (or names of controls associated with the selected command variables) and the suggested values for those command variables, transmitting the electronic alert to a control interface associated with the asset, emphasizing the controls to be adjusted in the control interface and displaying the suggested values for the adjustment, and accepting input from the human in the loop to confirm (or modify) the adjustment. The adjusted command variables are transmitted to the asset to cause the asset to be operated in accordance with the adjusted command variables. In this way, a hazard or other undesirable outcome for the asset may be mitigated or avoided by adjusting the controls in accordance with the suggestion. In one embodiment, the activities of block 235 may be performed by HITL alert generator 130 and control interface 157.

In one embodiment, enhanced situation awareness method 200 repeats continually during operation of an asset to provide real-time corrective control suggestions. The suggestions account for context of the ambient environment around the asset and the reflexive response of the asset to control adjustments, thereby providing more accurate solutions to incipient problems in the operational situation of the asset. Because the predicates that drive if-this-then-that decision-making are activated based on sequential anomaly detection rather than simple amplitude threshold setting on inputs, the predicates for an action will be triggered with increased accuracy in determining that an action should be taken. And, the sequential anomaly detection (using SPRT) will cause the predicates to be triggered at a statistically earliest possible time for identifying that the predicated action should be taken. Suggested control adjustments for taking the predicate-indicated action are then developed and delivered in real time for review and confirmation by the HITL, allowing a corrective solution to a problem to be implemented as rapidly as practically possible in HITL control of the asset. Thus, in one embodiment, not only does the enhanced situation awareness method 200 determine that action needs to be taken, it alerts an operator to the need at an earliest time and with increased accuracy in view of learned context, and at the same time provides an actionable adjustment that has been pre-vetted as a satisfactory (e.g., "optimal") solution, in real time. The enhanced situation awareness method 200 thereby delivers a number of improvements in speed and accuracy over other situation awareness systems and control systems. These improvements are not available absent the enhanced situation awareness systems and methods described herein.

—Further Embodiments of Enhanced Situation Awareness Method—

In one embodiment, generating the suggested value for the selected command variable further includes steps to optimize a candidate value for the selected command variable to arrive at the suggested value (for example as described at block 230). In one embodiment, generating the suggested value for the selected command variable (as discussed at block 230) includes iteratively adjusting the suggested value of the selected command variable until future values of the system satisfy a threshold condition. For example, enhanced situation awareness method 200 iteratively adjusts a candidate value of the selected command variable until a loss function based on the future values of the system variables satisfies a threshold condition. And, once the threshold condition is satisfied, enhanced situation awareness method 200 sets the suggested value to have a final value of the candidate value as of the satisfaction of the threshold. This iterative adjustment of the command variable(s) indicated by the binary-state predicates permutes the classifications delivered by the binary state predicates until the threshold for the loss function is satisfied.

In one embodiment, the loss function is based on a cumulative error between one or more of the future values of the system variables and estimates of the future values that are consistent with the reference operation of the asset (as discussed above at block 230), as follows. In one embodiment, the threshold condition is reaching a minimum value of the sum of residuals (or cumulative error) between the future values produced by the prediction model for the system variables and estimates of the future values made by the estimation model. These residuals indicate how far the predicted values differ from expected, nominal behavior of the asset. The candidate values for the selected command variable is adjusted until the sum of residuals is minimized. With this metric, a suggested value for the command variable will be selected that results in a future in which the asset most conforms to nominal behavior.

In one embodiment, the sequential analysis of block 220 is a sequential probability ratio test (SPRT). Thus, in one embodiment, determining anomaly statuses of the system variables based on residuals by enhanced situation awareness method 200 further includes performing sequential probability ratio tests on the system variables to generate the anomaly statuses. In one embodiment, determining anomaly statuses may also include determining anomaly statuses of the command variables or ambient variables.

In one embodiment, enhanced situation awareness method 200 further converts a stream of sensor readings of an asset and present states of commands for the asset into the stream multivariate observations of the system variables and the command variables. This may be performed as part of the step of accessing the stream of multivariate observations described at block 210.

In one embodiment, enhanced situation awareness method 200 generates the stream of multivariate observations (accessed in block 205) by, at least in part, converting digital sensor observations of broad-spectrum phenomena of the asset to symbolic observations of individual frequencies within the sensor observations. In one embodiment, the digital sensor observations may be measurements of broad-spectrum electromagnetic output of the asset, or broad-spectrum vibration or acoustic output of the asset. As used herein, the term broad-spectrum refers to measurements that cover a span or range of frequencies. The digital sensor observations may be at high rate (e.g., the Nyquist rate for the highest sensed frequency in the spectrum $f_h$ of $2\times f_h$ or other maximum resolution of a sensor). The symbolic observations of individual frequencies may be substantially lower, for example, 1 observation per second. The symbolic observations may be multivariate observations of individual frequencies within the broad spectrum. The symbolic observations of the individual frequencies may be included in the multivariate observations of the system variables.

In one embodiment, to convert from the broad-spectrum digital sensor observations to symbolic observations of individual frequencies, a fast Fourier transform (FFT) is performed on the broad-spectrum digital sensor observations in a moving window. In one embodiment, the moving window is for a length of time less than or equal to the amount of time between the symbolic observations of the multiple frequencies, for example 1 second. The power spectral density curve (the PSD) resulting from the moving window FFT shows the power of the vibrations by frequency range. The PSD curve is then subdivided into a pre-specified number of bins, for example 100 bins of equal width in the frequency spectrum. Individual frequencies of the bins may be pre-specified to represent the bins, in one simple example, the frequency at the midpoint of a bin may be used as representative frequency for the bin. The amplitudes at one or more of the individual frequencies selected to represent the bins may then be sampled to populate one symbolic observation of the individual frequencies within the sensor observations. This process may be repeated for a series of windows of the digital sensor observations to generate a series of symbolic observations of the individual frequencies. In this manner, observations of frequency-domain activity at the individual frequencies of the digital sensor observations is observed in the time domain.

In one embodiment, enhanced situation awareness method 200 further trains machine learning models with multivariate observations from the reference operation of the asset. The training configures a first machine learning model (an ambient ML model) to generate the first machine learning estimates of the ambient variables. The training configures a second machine learning model (an estimation ML model) to generate the second machine learning estimates of the system variables. The training configures a third machine learning model (a prediction ML model) to generate the predictions of the future values.

In one embodiment, before supplementing the multivariate observations with the estimates of the ambient variables (as described in block 215), enhanced situation awareness method 200 trains the ambient ML model with training observations of the reference operation of the asset. The training of the ambient ML model causes the ambient ML model to generate outputs that approximate the sensed values based on concurrent values of the system variables and command variables.

In one embodiment, before determining anomaly statues of the system variables (as described in block 220), enhanced situation awareness method 200 trains the estimation ML model with the training observations. The training causes the estimation ML model to generate outputs that approximate the value of individual system variables based on concurrent values of other system variables, the ambient variables, and the command variables.

In one embodiment, before generating a suggested value for the command variable for adjustment (as described in block 230), enhanced situation awareness method 200 trains the prediction ML model with the training observations. The training causes the prediction ML model to approximate a future value of individual command variables after the interval based on present values of the ambient variables, the system variables, and the command variables.

In one embodiment, presenting the command variable for adjustment and the suggested value for human-in-the-loop (HITL) confirmation (as described above at block 235) further includes steps to automate a HITL suggested value confirmation process. Enhanced situation awareness method 200 generates a graphical user interface for situation awareness. In the graphical user interface, enhanced situation awareness method 200 emphasizes the selected command variable in relation to other command variables. In the graphical user interface, enhanced situation awareness method 200 presents the suggested value as a user-selectable option. In the graphical user interface, enhanced situation awareness method 200 accepts a user input that selects the selectable option to indicate the human-in-the-loop confirmation. In response to the selection of the option to confirm the suggested value, the enhanced situation awareness method 200 automatically adjusts the selected command variable to match to the suggested value. Enhanced situation awareness method 200 then transmits the adjusted value for the selected command variable to the asset to control the asset according to the adjusted value. Thus, in one embodiment, enhanced situation awareness method 200 automatically adjusts the values of the set of command variables to match the suggested values to cause the asset to operate consistently with the adjusted values.

In one embodiment, the control interface includes a graphical user interface. The graphical user interface is configured to accept a user confirmation of the suggested values. Enhanced situation awareness method 200 may then further include presenting a selectable option to confirm the suggested values in the graphical user interface. And, in response to a user selection of the selectable option, enhanced situation awareness method 200 automatically adjusts the controls to correspond to the suggested values.

In one embodiment, the anomaly statuses of system variables are selected from among a no-anomaly state, an anomaly state, and an indeterminate state (as discussed above with reference to block 220). And, in one embodiment, evaluating the anomaly statuses with one or more predicates (as described above with reference to block 225) further includes determining an input parameter to be satisfied based on occurrence of pre-specified ones of the no-anomaly state, the anomaly state, and the indeterminate state for the system variables. For example, an input parameter of a predicate may be pre-configured to be satisfied when the no-anomaly ($H_0$) state occurs. Or, the input parameter may be pre-configured to be satisfied when the anomaly ($H_1$) state occurs. Or, the input parameter may be pre-configured to be satisfied when the indeterminate (not $H_0$ and not $H_1$) state occurs. In other words, whether or not the input parameters are triggered is detected based on a user-specified one of the three possible states above.

In one embodiment, a first predicate (evaluated in block 225) for instructing the HITL to take action about an operational situation of the asset may be accompanied by a parallel second predicate for cautioning the HITL about the operational situation. In one embodiment, the first predicate is activated by anomaly statuses being anomalous to trigger an alert to take prompt or immediate action to correct or mitigate a hazardous situation in progress. In one embodiment, the second, parallel predicate is activated by one or more of the anomaly statuses being indeterminate to trigger a cautionary alert when conditions are ripe for a hazardous situation to occur.

For example, the first and second predicates may have similar logical conditions, except that one or more inputs to the first predicate are activated by the input parameter satisfying the anomaly ($H_1$) state, while the one or more inputs to the second predicate are activated by the input parameter satisfying either the indeterminate (not $H_0$ and not $H_1$) state or the anomaly ($H_1$) state. In one embodiment, the second predicate for cautioning may initiate generation of a suggested value (at block 230) to prevent the onset of a more serious or hazardous operational situation that may be included in the electronic alert. Or, in one embodiment, the activation of the second cautionary predicate may directly trigger an electronic alert for display to the HITL, preemptively cautioning the HITL about the potential onset of a condition, while bypassing generation of suggested values.

In one embodiment, electronic alerts for taking action will trigger automatic acceptance of the suggested adjustments by the control interface while awaiting HITL confirmation or modification, while electronic alerts for cautioning about the potential onset of a condition needing a response does not trigger automatic acceptance. In one embodiment, the cautionary alerts and the alerts for action may be differentiated visually in a graphical user interface, for example by differing colors or differing icons.

Thus, in one embodiment, evaluation of the anomaly statuses with the one or more predicates (as discussed at block 225) further causes the predicates to be activated by one or more of the anomaly statuses being indeterminate. And, presenting the selected command variable and the suggested value for human-in-the-loop confirmation (as discussed at block 230) further causes the electronic alert to include a message that indicates a cautionary alert about potential onset of a hazardous operational condition, and that the suggested value avoids the onset of the hazardous operational condition. In one embodiment, the message is displayed in the control interface.

In one embodiment, the stream of multivariate observations is a live stream, and wherein the selected command variable and the suggested value are presented in real time for human-in-the-loop confirmation.

In one embodiment, enhanced situation awareness method 200 further automatically adjusts the values of the set of command variables to match the suggested values to cause the asset to operate consistently with the adjusted values. For example, where the controls of the asset are digital, the command variables are overwritten with the suggested values. Or, for example, where the controls of the asset are manual and electromechanically adjustable, electromechanical devices adjusts the controls to cause the signals produced by the controls to correspond to the suggested values. In one embodiment, this automatic adjustment may be carried out in advance of receiving confirmation or modification from the HITL in order to avoid a hazard. Or the automatic adjustment may be carried out in response to receiving the confirmation.

In one embodiment, the asset is a vehicle, and enhanced situation awareness method 200 automatically acts to avoid a hazard while awaiting the HITL confirmation of the selected command variable and suggested value to avoid the hazard. For example, where the asset is a ship, while awaiting a confirmation input enhanced situation awareness method 200 may automatically adjust the controls of the ship to match the value of the selected command variable to the suggested value to avoid the hazard. Or, for example, where the asset is an aircraft, while awaiting a confirmation input, enhanced situation awareness method 200 automatically adjusts the controls of the aircraft to match the value of the selected command variable to the suggested value to avoid the hazard.

Discussion and Further Embodiments

Situation Awareness (SA) and closely related Context Awareness (CA) have become vitally important to Human-in-the-Loop (HITL) supervisory control of complex business-critical and safety-critical assets. In one embodiment, the enhanced situation awareness system described herein incorporates context about ambient environmental conditions and reflexive responses of the asset to control adjustments. In various embodiments, the enhanced situation awareness system finds application in land, sea, and air defense, oil & gas exploration and production, utilities, aviation, navigation, autonomous vehicles, and datacenter equipment.

There are limitations to prior art situation awareness solutions. Significantly, prior art situation awareness systems are ill-adapted to use cases where the ambient environment can be changing dynamically for the monitored assets, where there may be reflexivity built into autonomous (and often "self-adaptive") feedback/control loops in subsystems of the monitored assets, and where there is fuzzy predicate ambiguity identification for defining the network of predicate interactions that define the overall state of the asset under surveillance.

In one embodiment, the enhanced situation awareness systems and methods taught herein are based on the Rasmussen cognitive behavior framework. For example, the layered Rasmussen cognitive behavior framework is populated with a symbiotic integration of three innovations: (1) autonomous ambient intelligence; (2) reflexive context awareness; and (3) SPRT-based predicate disambiguation. The enhanced situation awareness systems enhances SA for HITL supervisory control. The new approach to SA is fully robust with respect to dynamically varying ambient conditions. The new approach to SA accounts for reflexive behavior that may be present in self-adaptive middleware systems. And, the new approach to SA accommodates predicate-boundary "fuzziness" that in prior art systems led to increased false-alarms and/or missed-alarms that would cause human mistakes (in the best case) and human cognitive overload catastrophic events.

The most highly trained human operators of complex assets can reach a state of cognitive overload when provided with too much information. This is especially so where there are false alerts being issued from naïve threshold-based diagnostic modules or there happen to be two independent system anomalies happening at the same time. Accordingly, it may be desirable to mitigate and avoid cognitive overload situations for the human operators. There are three leading causes of cognitive overload for human operators performing HITL supervisory control:

- False alarms from sensor disturbances—the false alarm distracts a human operator and can lead to improper or delayed intervention actions;
- Two or more disturbances happening at the same time-concurrent disturbances cause confusing alerts and can lead to erroneous decision support by the human operator; and
- Missed (or delayed) alarms from low-sensitivity diagnostic techniques-missed or delayed alarms cause the human operator to delay decision support.

In one embodiment, the enhanced situation awareness system addresses significant technical challenges to presenting human-understandable assessments of the overall state of an asset. These challenges include: (1) dynamically varying ambient environment, (2) "reflexivity" that is built into "self-adaptive" feedback/control algorithms, and (3) "fuzzy predicate ambiguity". These challenges have presented human cognitive challenges in prior art SA frameworks for assessing the overall state of the assets under surveillance.

The enhanced situation awareness system improves over prior situation awareness systems by accommodating increasingly large numbers of sensors and resolving the sensed information to actionable situation information and recommendations. In one embodiment, the Rasmussen SA framework, forms a basis for an enhanced situation awareness system. The Rasmussen framework allows for context awareness within layers of middleware between the bottom level where the sensor inputs are ingested and the highest level where advice is generated for human-in-the-loop supervisory control. In one embodiment, constructing the enhanced situation awareness system around the Rasmussen framework makes it possible for a complex network of "if-this-then-that" (ITTT) conditional branching decisions based on the sensor readings of components of the asset to incorporate contextual awareness.

However, until the present enhanced situation awareness system, no situation awareness systems have been successfully implemented on the basis of a Rasmussen situation awareness framework. Implementation of situation awareness systems based on the Rassmussen framework was previously prevented by (1) inability to account for the effect of the ambient environment on variables of interest in individual ITTT decisions; (2) inability to accommodate reflexivity in the asset in ITTT decisions for context awareness; and (3) inability to handle "fuzzy" predicate inputs for context-aware ITTT predicate decisions. In one embodiment, the present enhanced situation awareness system solves these challenges by implementing (1) autonomous ambient intelligence to determine the impact of the ambient environment on variables of interest even in the absence of ambient sensor information; (2) reflexive context awareness that predicts reflexive behavior of the asset based on historical reflex reactions of the asset to control operations; and (3) SPRT-based predicate disambiguation that places sequential-analysis-based decision boundaries on predicates to substantially reduce FAPs and MAPs.

—Situation Awareness Elements—

FIG. 3 illustrates a high-level illustrative dataflow 300 consisting of three situation awareness elements in sequential order that are integrated according to the Rasmussen framework. The situation awareness elements include autonomous ambient intelligence 305, reflexive context awareness 310, SPRT-based predicate disambiguation 315, a situation awareness application 320, and an environment 325 (asset) under surveillance. The information and context developed through these situation awareness elements are provided to a situation awareness application 320. Present surveillance information about the asset or other environment 325 is also provided to situation awareness application 320. Situation awareness application 320 is configured to present situation information for HITL review. Reactivity 330 (also referred to herein as reflexivity) of the elements of the situation awareness system 305-325 increases in order from autonomous ambient intelligence 305 to environment 325.

FIG. 4 illustrates one example situation awareness process 400 based on ambient intelligence and permuted binary-state predicate classification. Situation awareness process 400 employs the second level of tactical contextual adaptation of Rasmussen's model of cognitive behavior in the Situation Awareness applications with SPRT based predicates and varying ambient conditions. The situation awareness process 400 may be applied to a system or a collection of sensors. Specifically, situation awareness process 400 converts digital observables 405 into symbolic observables 410. Digital observables 405 include both digital and analogue sensor data. Symbolic observables 410 are a format that is compatible with the next level of state variables. Situation awareness process 400 then transforms the symbolic observables into situation 415 that can be identified. Situation awareness process 400 effects the transformation from symbolic observables 410 to situation 415 using predicates 420 and appropriate functions, such as functions1 425 and functions2 430. For example, the situation awareness process 400 transforms raw displacements from an accelerometer (which is one example of digital observables 405) into fast Fourier transform (FFT) spectra via functions, and divides the spectra into frequency ranges, and subsequently determines if individual frequency ranges are acceptable or anomalous. The final convergence of information situation 415 informs the human-in-the-loop about the overall situation. For example, the situation 415 may describe End-to-End asset health in its real time operating environment to be Healthy, Dangerous, or Cautionary. And, for example, the situation 415 may advise services requests for small anomalies detected.

FIG. 5 illustrates one example of a situation awareness supervisory control algorithm 500 that is enhanced as described herein. SA supervisory control algorithm 500 is shown in detail with SPRT as the kernel for predicate decisions. A SPRT-based predicate assessment is introduced in combination with reflexive feedback/control algorithms and in combination with inferential ambient Intelligence (derived from object Environment) to produce situation awareness information for Human-in-the-Loop (e.g., asset SME 505) supervisory control of complex engineering assets. This setup avoids the see-saw effect problems described herein, since SPRT provides lowest mathematically achievable FAP and MAP, and moreover the FAP and MAP are independently prescribable.

In one embodiment, supervisory control algorithm 500 includes a situation awareness application 510, an environment 515, SPRT binary-hypothesis evaluations for predicates 520, and a context manager 525. Situation awareness application 510 includes cache 530, database 535, semantic agreement 540, observatory 545, MSET reasoning engine 550, and deployment 555. Situation awareness application 510 is configured to implement one embodiment of enhanced situation awareness method 200. SPRT binary hypothesis evaluations for predicates 520 is configured to evaluate predicates based on inputs of SPRT anomaly states for the symbolic observables, for example as shown and described above with reference to block 225.

Control settings of the asset may be adjusted by subject matter expert 505 in context manager 525. In one embodiment, context manager 525 provides a graphical user interface or other control interface configured to present suggested amendments to command variables and to accept control inputs to adjust the command variables. The predicate results, as well as the control adjustments or confirmations by SME 505 in context manager 525 are captured as feedback observations 533 by cache 530, for example in a feedback time series. Feedback observations 533 may include time series observations of adjusted control settings (adjusted command variables) and predicate results in conjunction with corresponding observations of the symbolic observables (system variables, ambient variables, and command variables) are captured by cache 530. For example, the multivariate observations of present states of system variables, ambient variables, and command variables are supplemented with observations of the output states of the predicates, and observations of adjusted states of the command variables following adjustment, modification, or confirmation by SME 505.

Cache 530 is configured to accept the feedback observations 533 of system variables, ambient variables, command variables, SME (user)-modified command variables, and predicate output states and store them, temporarily, as they arrive in real time. Cache 530 is configured to transfer the feedback observations 533 to database 535 and semantic agreement 540.

Database 535 is configured to store and serve data, for example time-series data. Database 535 is configured to store feedback observations 533, for example in a multivariate time series of observations of system variables, ambient variables, command variables, SME (user)-modified command variables, and predicate output states. Database 535 may also include a training dataset of time series of symbolic observables that describes a reference operation of the asset, in which the ambient variables, command variables, and system variables are recorded while the asset behaves nominally during operation.

In one embodiment, feedback observations 533 stored in database 535 may be used for additional training to fine tune the ML models. For example, feedback observations 533 capture control actions taken by the SME, and further capture the subsequent reflexive reaction of the asset to the control action. As new operational situations present themselves, and control actions are taken (as recommended by the system or otherwise), the reflexive response of the asset in that operational situation is recorded in database 535 in subsequent feedback observations. The additional records of reflexive behavior may be used for periodic additional training of 3$^{rd}$ ML model 195 to fine-tune the accuracy of 3$^{rd}$ model.

In one embodiment, the supplemental training process is automatically performed on a regular schedule, following a pre-set number of control actions, or upon input of a command 570 from a computing terminal associated with a developer 565. In this way, the reflexive behavior of the asset is inferred in greater detail by the 3$^{rd}$ ML model 195, causing predictions by the 3$^{rd}$ ML model of the future state of the asset to become more accurate. With the increased accuracy of predicting the reflexive behavior of the asset from this additional training, the suggested values for command variables or control adjustments more and more effectively mitigate or remove hazardous conditions in a continuous, learning improvement. Deployment 555 is configured to place trained or updated ML models into action for surveillance of the symbolic observables 560.

Semantic agreement 540 is configured to map varying terminology for variables to consistent terminology. Situation awareness systems may use multiple different terms or names for the same variable (e.g., sensor). Also, variables may be renamed during the course of the recorded history of operating the asset. Accordingly, semantic agreement 540 is configured to map differing terms for the same variable in sensors, signals, predicates, etc., to a consistent term for the variable. In one embodiment, the mapping is a data structure such as a lookup table keyed by the unique names for variables in the system, with a mapping to the consistent terms for the corresponding actual variables. In one embodiment, the newest or latest terms are used as the consistent terms for the variables. Reducing many names of variables to consistent terms enables training of ML models on old reference operation of the asset. And, using the consistent terms for the variables eliminates another source of confusion for the HITL. In one embodiment, the consistent terms for variables are used in alerts and messages presented for review by the HITL. In one embodiment, semantic agreement 540 is queried for the consistent term for a variable during composition of an electronic alert.

Observatory 545 is configured to receive digital observables from an environment, such as an asset. In one embodiment, the digital observables are streams of sensor readings of the physical phenomena in and around an asset and control states of an asset. Observatory 545 is configured to receive the digital observables as a streaming input, convert them to symbolic observables—in this case, a streaming time series of multivariate observations of system variables and command variables, and stream out the symbolic observables. In one embodiment, Observatory 545 is configured to convert the stream of digital observables to symbolic observables in real time. Observatory 545 is described in additional detail elsewhere herein, for example with reference to FIG. 1 and block 210.

MSET reasoning engine 550 is configured to store the trained configurations of MSET ML models and execute the trained MSET ML models. In one embodiment, MSET reasoning engine 550 operates 1$^{st}$ ML model 160, 2$^{nd}$ ML model 170, and 3$^{rd}$ ML model 195. MSET reasoning engine 550 accepts as input the stream of symbolic observables 560 of the system variables 145 and command variables 150 from observatory 545. Using trained 1$^{st}$ ML model 160, MSET reasoning engine 550 supplements the symbolic observables by adding estimates of ambient variables to the individual observations in the stream of symbolic observables 560, for example as discussed at block 215. Using trained 2$^{nd}$ ML model 170, MSET reasoning engine 550 generates estimates of nominal values of the symbolic observables (as supplemented) and residuals from actual values of the symbolic observables, and executes a sequential anomaly detection on the residuals, for example as discussed at block 220. Using trained 3$^{rd}$ ML model 195, MSET reasoning engine 550 predicts future values of the symbolic observables (as supplemented), as discussed in block 230.

Developer 565 has access rights to input commands 570 that initiate training and perform other configuration of the MSET models and other components included in MSET reasoning engine 550. In one embodiment, Developer 565 may enter commands that cause MSET reasoning engine 550 to be trained based on the training dataset of symbolic observables that describe reference operation of the asset, for example as discussed above with reference to 1$^{st}$ ML model 160, 2$^{nd}$ ML model 170, and 3$^{rd}$ ML model 195.

—Context Awareness with Reflexive Feedback/Control—

The reflexive context awareness 310 implements context awareness for reflexive feedback/control. In one embodiment, context awareness is used for the "middleware" implementation (which does not have direct human interaction) of an end-to-end SA data flow framework of for the enhanced situation awareness system. The enhanced situation awareness system may then advise human experts for the overall objective of decision support with optimized SA information.

In systems that exhibit little or no reflexive behavior, feedback/control algorithms have been used to take a human controller out of the loop for having to make manual adjustments. Trivial examples of such feedback/control operations in non-reflexive systems includes thermostat operations such as "if the temperature gets too warm in a dwelling, turn on the air conditioning, and when the temperature cools to the setpoint, turn off the air conditioning. Similar operations to cool automotive coolants and manage central processing unit temperatures through dynamic voltage and frequency scaling. Feedback/control algorithms for non-reflexive system can be written down as equations with configurable hard-coded parameters at design time, and/or with control parameters can be adjusted periodically by Service Engineers, or (in some cases) by end users.

However, there are increasingly prevalent complex multi-input multi-output (MIMO) control algorithms for which there cannot be crisp equations written down with hard-coded control parameters. This is so because the loss or "cost" function that the MIMO controls changes continuously with the inputs and outputs exhibit reflexivity—dynamic changes in a reaction or "reflexive" response to the real-time parameters. Consider, for example, a system for configuring power generation supply in an electrical distribution system. A reflexive feedback/control algorithm is implemented in which the controlled parameters change in real time with the loss or "cost" to be minimized. In particular, in real-time electricity pricing schemes, the cost of the electricity varies dynamically with the load on the grid, and consumers are given the means to make electricity consumption decisions based on the real-time pricing. Because the consumers make nonlinear and delayed consumption decisions in response to the real-time pricing, the control algorithm for generation of electricity must learn and take into account the reflexive response of the consumer into account when determining what power loadshape is to be produced in the grid on a real-time, look-ahead basis.

Another example of reflexivity in human-in-the-loop feedback/control is where highway usage fees are charged per mile driven based on reporting by vehicle-borne transponders, and in which the charge varies continuously and dynamically based on the volume of cars on the highway. For example, in Singapore, drivers can see the mileage fee in real time, leading to a reflexive tradeoff decision between entering the highway and paying the mileage fee or taking a longer route on surface streets and avoiding the fee. That tradeoff analysis reacts to a mileage fee that is changing in real time based on the decision that the collective of very many drivers are making at any given moment.

Engineering assets may also exhibit reflexivity, for example where responses of subsystems of the asset are automatic or spontaneous, delayed, and/or non-linear reactions to present states of the system, environment, and/or controls. In the feedback/control loops, the loss or cost functions may refer to a variety of metrics relevant to operation of the asset, such as a rate of fuel consumption, some measure of energy efficiency, a monetary cost of operation (as in the examples above), or other measure. With no reflexivity in feedback/control loops, the "cost function" is a constant. But with reflexivity in a feedback/control loop, the same control action does not necessarily yield the same "cost reduction" from that action (whether the cost is dollar costs, or energy efficiency, or overall safety margins) due to the varying impact of one (or more) control parameters. Feedback/control situations that possess such "reflexivity" in one or more of the cost function variables amplifies leading causes of Situation Awareness catastrophes—cognitive errors and cognitive overload—for human-in-the-loop supervisory control of engineering assets.

Accordingly, in one embodiment, the enhanced situation awareness system learns the reflexivity in feedback/control algorithm by implementing a multivariate machine learning model in a continuous, "what-if, project-ahead" mode. The multivariate machine learning model used for these look-ahead projections is trained using a deep database of telemetry, control actions, and system-state outcomes. In one embodiment multivariate machine learning model is a multivariate state estimation technique (MSET) model.

In one embodiment the enhanced situation awareness system accommodates reflexivity in one or more control parameters by evaluating quickly from a Data Historian situations that had similar states, the outcomes from control-adjustments as a function of the plurality of states in the DB 535, and the implicit variations in the control parameters that came from those control-adjustments. Then, the multivariate machine learning model in the project ahead configuration quickly simulates the overall response of the asset seconds or minutes into the future. This incorporates learned reflexivity of the asset from the data historian under all permutations of similar real-time conditions. In one embodiment, then, the enhanced situation awareness system provides the human-in-the-loop with optimal control adjustments that will result in the lowest cost for that asset and situation (whether that means lowest dollar cost, highest overall operating efficiency, highest safety margins, or some other metric).

—Ambient Intelligence—

Autonomous ambient intelligence 305 develops intelligence about ambient conditions from sensed environment. Feedback/control algorithms in assets may be affected by external ambient conditions that are reflected into and/or superimposed upon the metrics that actuate control actions of the asset. In one simple example of how ambient conditions influence the metrics that actuate controls, consider internal asset protection feedback/control algorithms implemented for enterprise server assets in a data center. Temperatures throughout the interior of enterprise servers create drastic variations in both compute and I/O performance. The outside cooling air temperature (that is, the ambient temperature) plays a significant role in the temperatures throughout the interior of an enterprise server. Accordingly, the ambient temperature may be sensed and accounted for in feedback/control algorithms for temperature regulation in the enterprise server.

However, many engineering assets have no ambient sensing capability. Or, the asset may include one ambient sensor that may drift out of calibration or suffer from other sensor degradation modes, which can then alter the operating efficiencies and/or safety margins for the control of the asset.

For use cases where performance, operational efficiency, and/or safety margins for an asset can vary with external ambient conditions, the enhanced situation awareness system applies a technique of multivariate advanced pattern recognition (for example, MSET) that learns the contributions to the internal conditions by the external ambient conditions. The MSET is trained for a given make/model of an asset, with precisely measured ambient conditions for the training of the model, to determine the extent to which internal measurements are influenced by the ambient environment. The model is trained initially with controlled high-precision measurements of the ambient environment and asset, then, for the same (or similar) make/model/class of assets in the field, the trained model infers for each of the distributed sensors the contribution attributable to ambient environment variations.

—SPRT-Based Predicate Declarations—

SPRT-based predicate disambiguation 315 is implemented by replacing threshold for parameter values with sequential hypothesis tests. SA applications assess challenges for complex assets and human interaction with those assets on the basis of predicates for safety margin. The predicates are functions that take one or more variables as input parameters and returns a Boolean value. In particular the predicates make a Boolean determination about the safety of the input parameters. The predicates assess the state of overall health and safety of an asset on the basis of Boolean conclusions such as "safe" vs. "anomaly" condition.

For example, a control room needs to be determined to be safe for access by human service personnel before the access occurs. Temperature levels, oxygen levels, radiation levels, air quality levels, pressure levels (for hermetically sealed environments), noise levels, and a wide variety of other conditions should be within OSHA standards (or other applicable standards) for human safety. The predicates therefore determine whether the applicable conditions would or would not indicate a dangerous condition for human engineers.

Conventional predicate conclusions in SA frameworks are based upon simple thresholds and are therefore subject to elevated False Alarm probabilities (FAPs) and Missed Alarm probabilities (MAPs). For example, temperature would be required to remain below a threshold of 120 degrees. And, for example, noise levels would be required to remain below a threshold of 85 decibels.

The predicates may be arranged in a matrix of interdependent predicates. In such a matrix, the outputs of one or more predicates may be inputs to one or more other predicates. For example, for complete safety, all safety predicates and all combinations of safety predicates may need to be met.

An intrinsic problem with prior-art SA algorithms that step through a sometimes-complex matrix of predicates is that applying high/low threshold limits to physics measurements is subject to a "see-saw effect" on threshold configurations between false-alarms and missed-alarms. This is because where a fixed predicate threshold is used to monitor a noisy physics parameter, spurious trips of the threshold occur due to observations on the tail of the gaussian noise curve. This triggers a "false alert" that causes the predicate condition to fail. This may be referred to as the False Alarm Probability, or FAP.

For SA human-in-the-loop supervisory control of complex engineering assets, false predicate violations cause human distractions and can contribute to human cognitive overload. For example, if red lights on a dashboard are actuating too frequently and subsequent investigation indicates that the condition was not really out of control, but was instead false alerts spurious data values at the tail of the gaussian distribution, other legitimate alerts may be ignored or missed in favor of investigating the false alert. Prior art conventional practice to avoid this problem from false predicate violations would be to simply move the high/low thresholds farther apart to reduce the number of alerts. However, this would cause an increase in the "missed alarm probability" (MAP). The increase in missed alerts would then cause the high/low thresholds closer together, increasing FAPs. Thus, with prior-art fixed threshold predicates, there is an endemic see-saw effect between FAPs and MAPs.

To eliminate the excessive MAPs, FAPs, and see-saw effect, in one embodiment the enhanced situation awareness system introduces the Sequential Probability Ratio Test (SPRT) for the predicate decisions. The SPRT has an optimality property in that for any physically measured parameters with measurement noise, the SPRT provides the lowest mathematically achievable FAP and MAP. And, moreover the FAP and MAP are independently prescribable—e.g., both MAP and FAP may be set highly restrictively (e.g., to a low values such as 0.00001) for safety-critical use cases where false alerts may jade user response to legitimate alerts; or e.g., MAP may be set less restrictively than FAP where lost production time is far less desirable than minor damage to an asset. There is therefore no see-saw effect as there have been in prior art systems.

In one embodiment, therefore, the enhanced situation awareness system introduces a SPRT-based predicate assessment matrix in combination with reflexive feedback/control algorithms and inferential ambient intelligence to produce highly accurate alerts and recommendations for Human-in-the-Loop supervisory control of complex engineering assets.

—Selected Advantages and Improvements—

Thus, in one embodiment, the Rasmussen cognitive behavior framework is populated in with a symbiotic integration of three innovations: (1) Autonomous Ambient Intelligence, (2) Reflexive Context Awareness, and (3) SPRT-based Predicate Disambiguation. This creates a novel integrated situation awareness framework that achieves the full functionality of Rasmussen's cognitive behavior end-to-end framework. In one embodiment, the enhanced situation awareness system is thereby enabled to achieve optimal SA for HITL supervisory control. In one embodiment, the enhanced situation awareness system is fully robust with respect to dynamically varying ambient conditions, reflexive behavior that may be present in self-adaptive middleware systems, and predicate-boundary "fuzziness". This is an improvement over prior art systems where these varying ambient conditions, reflexive behavior, and predicate boundary fuzziness led to increased false-alarms and/or missed-alarms that has caused human mistakes (in the best case) and human cognitive overload catastrophic events in numerous past defense, transportation, and industrial use cases.

In one embodiment, the enhanced situation awareness system improves accuracy in existing situation awareness systems by reducing false-alarm rates and missed-alarm rates. In one embodiment, the enhanced situation awareness system improves existing situation awareness systems by providing vetted or recommended control configurations that account for reflexive behavior of the asset.

In one embodiment, the enhanced situation awareness system requires no hardware upgrades anywhere in the existing assets other than computing capacity to perform the enhanced situation awareness method, making this invention immediately backward compatible with existing data centers and sensor-monitored assets.

—Overview of Multivariate ML and Anomaly Detection—

In general, multivariate ML modeling techniques used for ML anomaly detection predict or estimate what each signal (or variable) should be or is expected to be based on the other signals in a database or collection of time series signals. The estimated signal may be referred to as the "estimate". A multivariate ML state estimation model (referred to generally herein as an ML model) is used to make the predictions or estimates for values (or states) of individual variables based on the values (or states) provided for other variables. For example, for Signal 1 in a database of N signals, the ML model will compute an estimate for Signal 1 using signals 2 through N. In one embodiment, the ML model is configured in a multiple-input, multiple-output (MIMO) arrangement in which the estimates do not necessarily correspond to the input signals. For example, the ML model may produce estimates for Signals N+1 through N+M (such as ambient variables) based on inputs of Signals 1 through N (such as command and system variables). In one embodiment, the ML model is configured in a MIMO look-ahead or forecasting arrangement. In the look-ahead configuration, the ML model generates predictions of what Signals 1 through N (such as system variables) will be, following an interval, based on what values of Signals 1 through N and additional signals N+1 through N+M (such as command and system variables) previously were and currently are (over a time range of a look-behind window up though a time of the present observation).

In one embodiment, the ML model may be a non-linear non-parametric (NLNP) regression algorithm configured to perform state estimation of multiple variables. Such NLNP regression algorithms include auto-associative kernel regression (AAKR), and similarity-based modeling (SBM) such as the multivariate state estimation technique (MSET) (including Oracle's proprietary Multivariate State Estimation Technique (MSET2)). In one embodiment, the ML model may be another form of algorithm used for state estimation of multiple variables, such as a neural network (NN), Support Vector Machine (SVM), or Linear Regression (LR).

In one embodiment, an ML model is trained to produce estimates of what the values of variables should be based on training with time series readings (such as time series signals) that represent normal, correct, or otherwise nominal operation of a monitored asset. The training process involves iteratively optimizing a configuration of the ML model until the ML model consistently predicts expected values for the training portion of the individual signal that match (within an acceptable tolerance) target values for the output of the ML model. The target values are a set of values of what the estimate is expected to be, given a particular set of inputs to the ML model.

To train the ML model, the target values and time series readings are used to adjust the ML model. In particular, a configuration of correlation patterns between the input variables of the ML model is automatically adjusted based on present values of the time series readings and the target values. The automatic adjustment causes the ML model to produce estimates from input values of the time series readings that approximate the target values within the acceptable tolerance, that is, with sufficient accuracy to satisfy a threshold for concluding that the ML model is trained. In one embodiment, sufficient accuracy of estimates to conclude the ML model is trained may be determined by residuals between estimates and target values for the respective variables being minimized below a pre-configured training threshold. A residual (as discussed above) is a difference between an actual value (such as a measured, observed, sampled, or resampled value) and an estimate, reference, or prediction of what the value is expected to be. At the completion of training, the ML state estimation model has inferred (learned) correlation patterns between variables.

Anomaly Detection. In one embodiment, the ML model may be used for detecting anomalous states of the time series readings (for example as described above with reference to the system ML model ($2^{nd}$ ML model 170) and block 220). In one embodiment, the ML model is configured to generate estimated values for what each individual variable of a time series reading (observation) should be, based on present input of actual values for the other variables and prior training with target values for the variables from reference operation of an asset. The ML model so configured will therefore indicate what the values ought to be in a given moment, provided the asset is behaving normally. The estimates thus correspond to the inputs as pairs of actual and estimated values for the same set of variables. Here, the actual values of the training portion of the collection of time series signals are used as target values for training.

Following training, the ML model may be used to monitor time series readings for anomalous states. Subtracting an actual, measured value for each signal from a corresponding estimate gives the residuals (or differences) between the values of the signal and estimate. Where there is an anomaly in a signal, the measured signal value departs from the estimated signal value. This causes the residuals to increase, triggering an anomaly alarm. Thus, the residuals are used to detect such anomalies where one or more of the residuals indicates such a departure, for example by becoming consistently excessively large.

For example, the presence of an anomaly may be detected by a sequential probability ratio test (SPRT) analysis of the actual and estimated values for a signal (for example as discussed above with reference to block 220). In one embodiment, the SPRT calculates a cumulative sum of the log-likelihood ratio for each successive residual between an actual value for a signal and an estimated value for the signal, and compares the cumulative sum against a threshold value indicating anomalous deviation. Where the threshold is crossed, an anomaly is detected, and an electronic alert indicating the anomaly may be generated.

Supplemental Intelligence.

In one embodiment, the ML model may be used to supplement the multivariate observations of a set of variables with estimates of other variables (for example as described above with reference to the ambient ML model ($1^{st}$ ML model 160), ambient variables 155, and block 215). In one embodiment, the ML model is configured to generate estimated values for what each of a set of supplemental variables (such as ambient variables 155) should be, based on present input of a set of available variables (such as system variables 145 and command variables 150) and prior training with target values for the supplemental variables and available variables from reference operation of an asset. The ML model configured in this manner will indicate what the ambient variables (or other supplemental variables) are likely to be in a given moment, provided the asset is behaving normally. The estimates are thus values for supplemental or additional variables that are produced from the inputs of the actual values that are available. Here, actual values of the supplemental variables of the training portion of time series signals are used as target values for training. For example, observations of command variables, and system variables taken during reference operation are used as inputs to the ML model during training, and corresponding (in time) observations of actual values of the ambient variables taken during the reference operation are used as target values for training.

Following training, the ML model may be used to generate ambient intelligence about the ambient conditions around an asset from existing multivariate observations of the operational state of the asset. For each multivariate observation of the signals for the system variables and command variables, the ML model produces additional intelligence or information describing the likely ambient conditions surrounding the asset during that observation. These values of ambient variables may then be added to the multivariate observation to supplement the information available about the point of time described by the observation.

Look-ahead Forecasting. In one embodiment, the ML model may be used to look ahead, forecast, or otherwise predict states of time series variables (for example as described above with reference to the forecast ML model ($3^{rd}$ ML model 195) and block 230). In one embodiment, the ML model is configured to generate predicted values for what each individual variable of a time series reading should be following a pre-specified interval of time. The predicted values are generated based on input of a sequence of actual values for the time series readings preceding and including a reading at a present time, and (ii) prior training with target values of the variables following a delay of the interval of time during the reference operation of an asset. The ML model so configured will indicate what the input variables are likely to be after a delay of the interval of time, provided the asset is reacting normally or in an expected way. The predictions thus correspond to the inputs as pairs of projected values and sequencies of prior actual values for a given set of variables. Here, values of the variables in observations of the training set are used as inputs to the ML model during training, and values of the variables for observations of the training set occurring later by the interval are used as the target values for training. Additional ML models may be trained for different intervals of time, for example, forecast ML models for 10 seconds, 1 minute, 10 minutes, one hour, etc.

Following training, the ML model may be used to forecast what the state of an asset will be after a delay of the interval. The learned correlations between the inputs and target values account for reflexive behavior of the asset. Forecast states with different values for a command variable may analyzed to determine a suggested value for the command variable that minimizes a loss function for the forecast state, for example as described above with reference to block 230.

—Electronic Alerts—

In one embodiment, an electronic alert may be generated and sent in response to a detection of an anomalous signal value. In one embodiment, an electronic alert is generated by composing and transmitting a computer-readable message. The electronic alert may be composed and then transmitted for subsequent presentation on a display or other action. In one embodiment, the computer readable message may be composed by populating a template data structure with content describing the anomaly. The computer readable message may include content describing an anomaly that triggered the alert, such as a timestamp or observation at which the anomaly was detected, an indication of the signal value that caused the anomaly, an identification of variable (in the multivariate set of variables) for which the anomaly occurred, and an asset under observation for which the alert is applicable.

In one embodiment, the electronic alert is a message that is configured to be transmitted over a network, such as a wired network, wi-fi network, or other communications infrastructure. The electronic alert may be configured to be read by a computing device. In one embodiment, the electronic alert may be presented in a user interface such as a user interface such as a graphical user interface (GUI) by extracting the content of the electronic alert by a REST API that has received the electronic alert. The GUI may present a message, notice, or other indication that the status of operation of a specific machine, asset component, or other signal source has entered (or left) an anomalous state of operation. In one embodiment, the GUI may be shown in a display associated with a control interface (as shown in FIG. 1). In one embodiment, the electronic alert includes an indication of a particular control (for example indicated by including a command variable associated with the particular control) and suggested value for that control for presentation in the GUI for HITL confirmation.

The electronic alert may be configured as a request (such as a REST request) used to trigger initiation of an automated function in response to detection of an anomaly in a variable. In one embodiment, the automated function is configured to adjust the physical state or activity of the asset or component of the asset that is associated with the cluster, such as by triggering reduction of power to (e.g., slowdown or shutdown) to the asset or component of the asset. In one embodiment, these responses can be provided in real-time, thereby timely mitigating or preventing degradation or damage to the asset or personnel operating the asset.

—Cloud or Enterprise Embodiments—

In one embodiment, the present system (such as enhanced situation awareness system 100) is a computing/data processing system including a computing application or collection of distributed computing applications for access and use by other client computing devices that communicate with the present system over a network. In one embodiment, enhanced situation awareness system 100 is a component of a time series data service that is configured to gather, serve, and execute operations on time series data. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions. In one embodiment, enhanced situation awareness system 100 is a centralized server-side application that provides at least the functions disclosed herein and that is accessed by many users by way of computing devices/terminals communicating with the computers of enhanced situation awareness system 100 (functioning as one or more servers) over a computer network. In one embodiment enhanced situation awareness system 100 may be implemented by a server or other computing device configured with hardware and software to implement the functions and features described herein.

In one embodiment, the components of enhanced situation awareness system 100 may be implemented as sets of one or more software modules executed by one or more computing devices specially configured for such execution. In one embodiment, the components of enhanced situation awareness system 100 are implemented on one or more hardware computing devices or hosts interconnected by a data network. For example, the components of enhanced situation awareness system 100 may be executed by network-connected computing devices of one or more computing hardware shapes, such as central processing unit (CPU) or general-purpose shapes, dense input/output (I/O) shapes, graphics processing unit (GPU) shapes, and high-performance computing (HPC) shapes.

In one embodiment, the components of enhanced situation awareness system 100 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Components of enhanced situation awareness system 100 may (i) generate or compose an electronic message or signal to issue a command or request to another component, (ii) transmit the message or signal to other components of enhanced situation awareness system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems may access information or applications provided by enhanced situation awareness system 100, for example through a web interface server. In one embodiment, the remote computing system may send requests to and receive responses from enhanced situation awareness system 100. In one example, access to the information or applications may be effected through use of a web browser on a personal computer or mobile device. In one example, communications exchanged with enhanced situation awareness system 100 may take the form of remote representational state transfer (REST) requests using JavaScript object notation (JSON) as the data interchange format for example, or simple object access protocol (SOAP) requests to and from XML servers. The REST or SOAP requests may include API calls to components of enhanced situation awareness system 100.

—Software Module Embodiments—

In general, software instructions are designed to be executed by one or more suitably programmed processors accessing memory. Software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

—Computing Device Embodiment—

Figure 6:
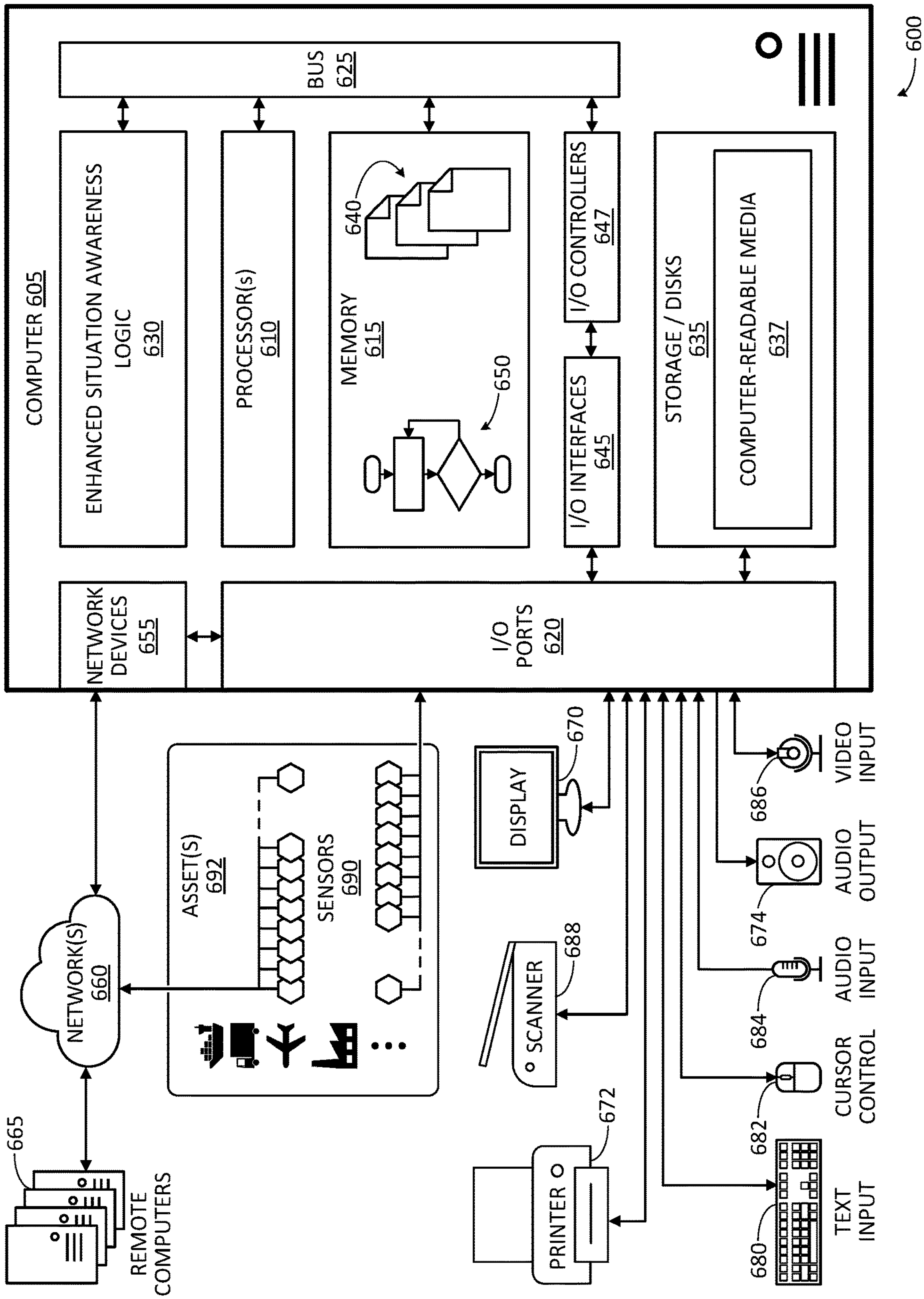
FIG. 6 illustrates an embodiment of a computing system configured with the example systems and/or methods disclosed.

FIG. 6 illustrates an example computing system 600 that is configured and/or programmed as a special purpose computing device(s) with one or more of the example systems and methods described herein, and/or equivalents. The example computing device may be a computer 605 that includes at least one hardware processor 610, a memory 615, and input/output ports 620 operably connected by a bus 625. In one example, the computer 605 may include enhanced situation awareness logic 630 configured to facilitate autonomous situation awareness based on ambient intelligence and permuted binary-state predicate classification similar to the logic, methods, and systems shown in FIGS. 1, 2, 3, 4, and 5.

In different examples, the logic 630 may be implemented in hardware, one or more non-transitory computer-readable media 637 with stored instructions, firmware, and/or combinations thereof. While the logic 630 is illustrated as a hardware component attached to the bus 625, it is to be appreciated that in other embodiments, the logic 630 could be implemented in the processor 610, stored in memory 615, or stored in disk 635.

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application-specific integrated circuit (ASIC) programmed to facilitate autonomous situation awareness based on ambient intelligence and permuted binary-state predicate classification. The means may also be implemented as stored computer executable instructions that are presented to computer 605 as data 640 that are temporarily stored in memory 615 and then executed by processor 610.

Logic 630 may also provide means (e.g., hardware, non-transitory computer-readable medium that stores executable instructions, firmware) for performing one or more of the disclosed functions and/or combinations of the functions.

Generally describing an example configuration of the computer 605, the processor 610 may be a variety of various processors including dual microprocessor and other multi-processor architectures. A memory 615 may include volatile memory and/or non-volatile memory. Non-volatile memory may include, for example, read-only memory (ROM), programmable ROM (PROM), and so on. Volatile memory may include, for example, random access memory (RAM), static RAM (SRAM), dynamic RAM (DRAM), and so on.

A storage disk 635 may be operably connected to the computer 605 via, for example, an input/output (I/O) interface (e.g., card, device) 645 and an input/output port 620 that are controlled by at least an input/output (I/O) controller 647. The disk 635 may be, for example, a magnetic disk drive, a solid-state drive, a floppy disk drive, a tape drive, a Zip drive, a flash memory card, a memory stick, and so on. Furthermore, the disk 635 may be a compact disc ROM (CD-ROM) drive, a CD recordable (CD-R) drive, a CD rewritable (CD-RW) drive, a digital video disc ROM (DVD ROM) drive, and so on. The storage/disks thus may include one or more non-transitory computer-readable media. The memory 615 can store a process 650 and/or a data 640, for example. The disk 635 and/or the memory 615 can store an operating system that controls and allocates resources of the computer 605.

The computer 605 may interact with, control, and/or be controlled by input/output (I/O) devices via the input/output (I/O) controller 647, the I/O interfaces 645, and the input/output ports 620. Input/output devices may include, for example, one or more network devices 655, displays 670, printers 672 (such as inkjet, laser, or 3D printers), audio output devices 674 (such as speakers or headphones), text input devices 680 (such as keyboards), cursor control devices 682 for pointing and selection inputs (such as mice, trackballs, touch screens, joysticks, pointing sticks, electronic styluses, electronic pen tablets), audio input devices 684 (such as microphones or external audio players), video input devices 686 (such as video and still cameras, or external video players), image scanners 688, video cards (not shown), disks 635, and so on. The input/output ports 620 may include, for example, serial ports, parallel ports, and USB ports.

The computer 605 can operate in a network environment and thus may be connected to the network devices 655 via the I/O interfaces 645, and/or the I/O ports 620. Through the network devices 655, the computer 605 may interact with a network 660. Through the network 660, the computer 605 may be logically connected to remote computers 665. Networks with which the computer 605 may interact include, but are not limited to, a local area network (LAN), a wide area network (WAN), and other networks.

In one embodiment, the computer 605 may be connected to sensors 690 through I/O ports 620 or networks 660 in order to receive information about physical states of monitored machines, devices, systems, facilities, or other apparatuses (collectively referred to as "assets" 692) and components thereof. The assets 692 generally include any type of device, machinery or facility with components that perform measurable activities. For example, an asset may be an aircraft, motor vehicle, ship, oil refinery, power plant, manufacturing facility, machine tool, computer server, or other system, as well as the various components of such systems such as an engine, motor, hydraulic system, turbine, furnace, pump, fan, or other components. In one embodiment, sensors 690 may be operably connected or affixed to asset(s) 692 or otherwise configured to detect physical phenomena associated with the asset 692. The sensors 690 may produce digital observables (such as raw sensor readings) taken from the asset 692. In one embodiment, the sensors 690 may include components configured to convert the digital observables into symbolic observables (such as multivariate time series observations) taken from the asset 692. The sensors 690 may be network-connected sensors. Assets 692 with network-connected sensors may be referred to as Internet of Things (IoT)-connected devices. The network connection of the sensors 690 and networks 660 may be wired or wireless.

In one embodiment, the sensors 690 include one or more vibration sensors, such as single- and/or multi-axial accelerometers, microphones, hydrophones, piezoelectric, or other vibration sensors that are configured to register physical vibration, such as mechanical oscillation, occurring in and around asset 692. In one embodiment, the sensors 690 may also include (but are not limited to): a temperature sensor (such as a thermocouple or resistive temperature detector), a voltage sensor, an electric current sensor, a pressure sensor, a rotational speed sensor, a flow meter sensor, a speedometer or other speed sensor, an airspeed/waterspeed sensor or anemometer, an electromagnetic radiation sensor such as an antenna, a proximity sensor, a gyroscope, an inclinometer, a global positioning system (GPS) sensor, a fuel gauge, a torque sensor, a flex sensor, a nuclear radiation sensor, sonar, radar, depth sensor, range finders, fluid salinity/density sensor, conductivity sensor, or any of a wide variety of other sensors or transducers for generating electrical signals that represent sensed physical phenomena, for example physical phenomena occurring in or around asset 692. In one embodiment, the sensors may include navigation data inputs such as digital charts of terrain (above and/or below water) surrounding the asset. In one embodiment, the sensors may include sensors configured to capture manual or digital control inputs.

In one embodiment, computer 605 is configured with logic, such as software modules, to collect readings from sensors 690 and store them as observations in a time series data structure such as a time series database. In one embodiment, the computer 605 polls sensors 690 to retrieve sensor telemetry readings. In one embodiment, the sensor telemetry readings may be a time series of multivariate observations (for example structured as vectors) that includes sensed values for a plurality of the sensors 690. In one embodiment, the computer 605 passively receives sensor telemetry readings actively transmitted by sensors 690. For example, the sensor telemetry readings may be transmitted in a real time stream to the computer 605 from the sensors 690. In one embodiment, the ongoing or streaming time series database is stored in batches of observations in a circular buffer, and the batches processed in real time. In one embodiment, the computer 605 receives one or more collections, sets, or databases of sensor telemetry readings previously collected from sensors 690, for example from storage 635 or from remote computers 665.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. One or more non-transitory computer-readable media that include stored thereon computer-executable instructions that when executed by at least a processor of a computer cause the computer to:

access a stream of multivariate observations of (i) system variables about a present operational state of an asset, and (ii) command variables about a present configuration of controls of the asset;

supplement the multivariate observations with first machine learning estimates of ambient variables about a present operating environment around the asset, wherein the first machine learning estimates are consistent with a reference operation of the asset based on concurrent values of the system variables and the command variables;

determine anomaly statuses of the system variables based on sequential analysis of residuals between the system variables and second machine learning estimates of the system variables, wherein the second machine learning estimates for individuals of the system variables are consistent with the reference operation of the asset based on concurrent values of others of the system variables, the ambient variables, and the command variables;

evaluate the anomaly statuses of the system variables with one or more predicates associated with the controls of the asset to select one of the command variables to be adjusted;

generate a suggested value for the selected command variable based on machine learning predictions of future values of the system variables, the ambient variables, and the command variables, wherein the predictions are consistent with the reference operation of the asset after an interval following present values of the system variables, the ambient variables, and the command variables;

generate an electronic alert to adjust the controls of the asset to match the suggested value for the selected command variable; and automatically adjust a value of the selected command variable to match the suggested value to cause the asset to avoid a hazard.

2. The non-transitory computer-readable media of claim 1, wherein the instructions to generate the suggested value further cause the computer to:

iteratively adjust a candidate value of the selected command variable until a loss function based on the future values of the system variables satisfies a threshold; and set the suggested value to have a final value of the candidate value.

3. The non-transitory computer-readable media of claim 2, wherein the loss function is based on a cumulative error between one or more of the future values of the system variables and estimates of the future values that are consistent with the reference operation of the asset.

4. The non-transitory computer-readable media of claim 1, wherein the instructions to determine anomaly statuses of the system variables based on sequential analysis of residuals further cause the computer to perform sequential probability ratio tests on the system variables to generate the anomaly statuses.

5. The non-transitory computer-readable media of claim 1, wherein the instructions further cause the computer to generate the stream of multivariate observations by, at least in part, converting digital sensor observations of broad-spectrum phenomena to symbolic observations of individual frequencies within the digital sensor observations.

6. The non-transitory computer-readable media of claim 1, wherein the instructions further cause the computer to train machine learning models with multivariate observations from the reference operation of the asset, wherein training the machine learning models configures a first machine learning model to generate the first machine learning estimates of the ambient variables, a second machine learning model to generate the second machine learning estimates of the system variables, and a third machine learning model to generate the predictions of the future values.

7. A computer-implemented method, comprising:

accessing a stream of multivariate observations of (i) system variables about a present operational state of an asset, and (ii) command variables about a present configuration of controls of the asset;

supplementing the multivariate observations with estimates of ambient variables that are estimated from the multivariate observations by a first machine learning model, wherein the first machine learning model is trained to estimate values for the ambient variables that are consistent with sensed values for the ambient variables sensed during a reference operation of the asset;

determining anomaly statuses of the system variables based on sequential analysis of residuals between the system variables and estimates of the system variables that are estimated from the supplemented multivariate observations by a second machine learning model, wherein the second machine learning model is trained to estimate values for the system variables that are consistent with the reference operation of the asset;

evaluating the anomaly statuses of the system variables with one or more predicates associated with controls of the asset to select one command variable for adjustment out of the command variables;

generating a suggested value for the selected command variable based on present and future values of the supplemented multivariate observations using a third machine learning model, wherein the third machine learning model is trained to predict what the future values will be after an interval that are consistent with the reference operation of the asset;

presenting the selected command variable and the suggested value for human-in-the-loop confirmation; and automatically adjust the selected command variable to match the suggested value to cause the asset to avoid a hazard.

8. The computer-implemented method of claim 7, wherein presenting the selected command variable for adjustment and the suggested value for the human-in-the-loop confirmation further comprises:

generating a graphical user interface for situation awareness;

emphasizing the selected command variable in relation to other command variables;

presenting the suggested value as a user-selectable option;

accepting a user input that selects the user-selectable option to indicate the human-in-the-loop confirmation;

automatically adjust a value of the selected command variable to match the suggested value; and transmit the adjusted value for the selected command variable to the asset to control the asset according to the adjusted value.

9. The computer-implemented method of claim 7, wherein the anomaly statuses of the system variables are selected from among a no-anomaly state, an anomaly state, and an indeterminate state, and wherein evaluating the anomaly statuses with one or more predicates further comprises, determining an input parameter to be satisfied based on occurrence of pre-specified ones of the no-anomaly state, the anomaly state, and the indeterminate state for the system variables.

10. The computer-implemented method of claim 7, further comprising:

before supplementing the multivariate observations with the estimates of the ambient variables, training the first machine learning model with training observations of the reference operation of the asset, wherein the training causes the first machine learning model to approximate the sensed values based on concurrent values of the system variables and command variables;

before determining the anomaly statuses of the system variables, training the second machine learning model with the training observations, wherein the training causes the second machine learning model to approximate respective values of individual system variables based on concurrent values of other system variables, the ambient variables, and the command variables; and before generating a suggested value for the selected command variable for adjustment, training the third machine learning model with the training observations, wherein the training causes the third machine learning model to approximate a future value of individual command variables after the interval based on present values of the ambient variables, the system variables, and the command variables.

11. The computer-implemented method of claim 7, further comprising converting a stream of sensor readings of an asset and present states of commands for the asset into the stream of multivariate observations of the system variables and the command variables.

12. The computer-implemented method of claim 7, wherein the stream of multivariate observations is a live stream, and wherein the selected command variable and the suggested value are presented in real time for the human-in-the-loop confirmation.

13. The computer-implemented method of claim 7, wherein the sequential analysis is a sequential probability ratio test.

14. A system, comprising:

at least one processor connected to at least one memory;

a sensor system that is configured to sense physical phenomena associated with an asset and deliver a stream of multivariate observations of (i) system variables about a present operational status of the asset, and (ii) command variables about a present configuration of controls of the asset;

a human-in-the-loop control interface configured to (a) emphasize a selected control of an asset with respect to other controls, and (b) present recommended values for the selected control of the asset;

one or more non-transitory computer-readable media that include stored thereon instructions that, when executed by the at least one processor accessing the memory cause the system to:

supplement the multivariate observations with machine learning estimates of ambient variables based on the system variables and command variables;

determine anomaly statuses of the system variables based on sequential analysis of residuals between the system variables and machine learning estimates of expected values for the system variables that are estimated from the supplemented multivariate observations;

evaluate the anomaly statuses with predicates associated with the controls of the asset to select one of the command variables to be adjusted;

generate a suggested value for the selected command variable based on machine learning predictions of future values for the system variables following an interval;

in the human-in-the-loop control interface, emphasize the selected command variable in relation to other command variables, and display the suggested value for the selected command variable; and automatically adjust the selected command variable to match the suggested value to cause the asset to avoid a hazard.

15. The system of claim 14, wherein the instructions to generate the suggested value for the selected command variable further cause the system to iteratively adjust the suggested value of the selected command variable until future values of the system satisfy a threshold condition.

16. The system of claim 14, wherein the human-in-the-loop control interface is a graphical user interface that is further configured to accept a user confirmation of the suggested values, wherein the instructions further comprise:

presenting a selectable option to confirm the suggested value in the graphical user interface; and in response to a user selection of the selectable option, automatically adjust the controls to correspond to the suggested value.

17. The system of claim 14, wherein the asset is a ship, wherein the instructions further comprise, while awaiting a confirmation input, automatically adjusting the controls of the ship to match the value of the selected command variable to the suggested value to avoid the hazard.

18. The system of claim 14, wherein the asset is an aircraft, wherein the instructions further comprise, while awaiting a confirmation input, automatically adjusting the controls of the aircraft to match the value of the selected command variable to the suggested value to avoid the hazard.

19. The system of claim 14, wherein the instructions to evaluate the anomaly statuses with one or more predicates further cause the one or more predicates to be activated by one or more of the anomaly statuses being indeterminate; and wherein the instructions further cause the system to, in the human-in-the-loop control interface, display a message that indicates a cautionary alert about a potential onset of a hazardous operational condition, and that the suggested value avoids the potential onset of the hazardous operational condition.

* * * * *